(12) United States Patent
Chen et al.

(10) Patent No.: US 7,801,482 B2
(45) Date of Patent: Sep. 21, 2010

(54) PACKET COMMUNICATION SYSTEM, PACKET COMMUNICATION METHOD, BASE STATION, MOBILE STATION, CONTROL DEVICE, AND PACKET COMMUNICATION PROGRAM

(75) Inventors: Lan Chen, Yokohama (JP); Daisuke Kitazawa, Kawasaki (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/273,344

(22) Filed: Nov. 18, 2008

(65) Prior Publication Data

US 2009/0073931 A1    Mar. 19, 2009

Related U.S. Application Data

(62) Division of application No. 10/515,628, filed as application No. PCT/JP03/07210 on Jun. 6, 2003, now Pat. No. 7,471,927.

(30) Foreign Application Priority Data

Jun. 6, 2002    (JP)    ............................. 2002-166263

(51) Int. Cl.
*H01Q 11/12* (2006.01)
*H04B 1/04* (2006.01)
*H04B 7/00* (2006.01)

(52) U.S. Cl. ...................... 455/39; 455/127.1; 455/522; 370/318

(58) Field of Classification Search ................... 455/69, 455/127.1, 450–452.2, 509, 522; 370/318, 370/329–330, 341
See application file for complete search history.

(56) References Cited

U.S. PATENT DOCUMENTS

| | | | |
|---|---|---|---|
| 5,551,057 | A | 8/1996 | Mitra |
| 5,553,316 | A | 9/1996 | Diepstraten et al. |
| 5,590,409 | A | 12/1996 | Sawahashi et al. |

(Continued)

FOREIGN PATENT DOCUMENTS

CN    1120293    4/1996

(Continued)

OTHER PUBLICATIONS

Deepak Ayyagari, et al., "Power Control for Link Quality Protection in Cellular DS-CDMA Networks with Integrated (Packet and Circuit) Services", Proceedings of the 5th Annual ACM/IEEE International Conference on Mobile Computing and Networking, XP-000896076, conf. 5, Aug. 15, 1999, pp. 96-101.

*Primary Examiner*—Simon D Nguyen
(74) *Attorney, Agent, or Firm*—Oblon, Spivak, McClelland, Maier & Neustadt, L.L.P.

(57) ABSTRACT

The present invention improves a system capacity and satisfaction rate with a quality of service in packet communications performed through a radio link established between a transmitting station and a receiving station by dynamically limiting transmission power of packets in the transmitting station and keeping an increase of an interference level in the receiving station, which belongs to another cell, within a TPC margin. The present invention includes a resource allocator 115 configured to set transmission power of packets in a next step period, by use of transmission power of packets in a preceding step period (slot) and an interference level of the receiving station.

3 Claims, 19 Drawing Sheets

U.S. PATENT DOCUMENTS

| | | | |
|---|---|---|---|
| 5,621,723 A * | 4/1997 | Walton et al. | 370/335 |
| 5,852,782 A | 12/1998 | Komatsu | |
| 6,166,622 A | 12/2000 | Hosur et al. | |
| 6,259,685 B1 * | 7/2001 | Rinne et al. | 370/330 |
| 6,359,932 B2 | 3/2002 | Olafsson | |
| 6,477,368 B1 * | 11/2002 | Korneluk et al. | 455/423 |
| 6,529,494 B1 * | 3/2003 | Ostman et al. | 370/337 |
| 6,590,883 B1 | 7/2003 | Kitade et al. | |
| 6,643,272 B1 | 11/2003 | Moon et al. | |
| 6,650,691 B2 * | 11/2003 | Cramer, III | 375/146 |
| 6,667,965 B1 * | 12/2003 | Yamaura et al. | 370/347 |
| 6,741,867 B1 | 5/2004 | Tetsuya | |
| 6,937,874 B2 | 8/2005 | Cramer, III | |
| 7,009,944 B1 * | 3/2006 | Hulbert | 370/278 |
| 7,340,267 B2 * | 3/2008 | Budka et al. | 455/522 |
| 7,457,268 B2 * | 11/2008 | Baudoin et al. | 370/335 |
| 2004/0100920 A1 * | 5/2004 | Ball et al. | 370/318 |

FOREIGN PATENT DOCUMENTS

| | | |
|---|---|---|
| EP | 0 961 417 | 12/1999 |
| EP | 1 063 788 | 12/2000 |
| JP | 11-234202 | 8/1999 |
| JP | 2000-217143 | 8/2000 |
| JP | 2002-077044 | 3/2002 |
| JP | 2002-165261 | 6/2002 |
| WO | WO 98/44754 | 10/1998 |
| WO | WO 00/62442 | 10/2000 |
| WO | WO 01/08322 | 2/2001 |
| WO | WO 01/22599 | 3/2001 |
| WO | WO 01/24568 | 4/2001 |
| WO | WO 01/86834 | 11/2001 |

* cited by examiner

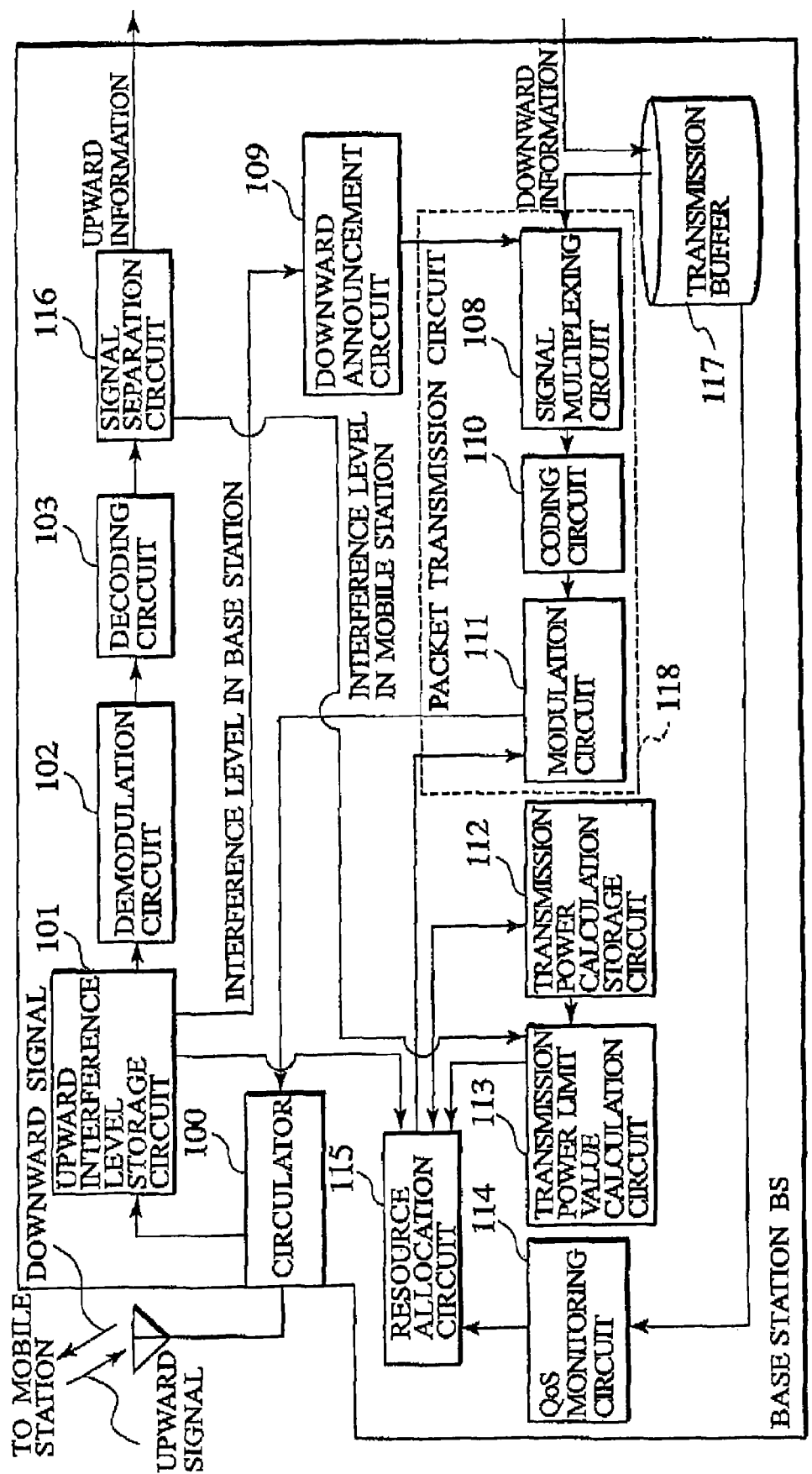

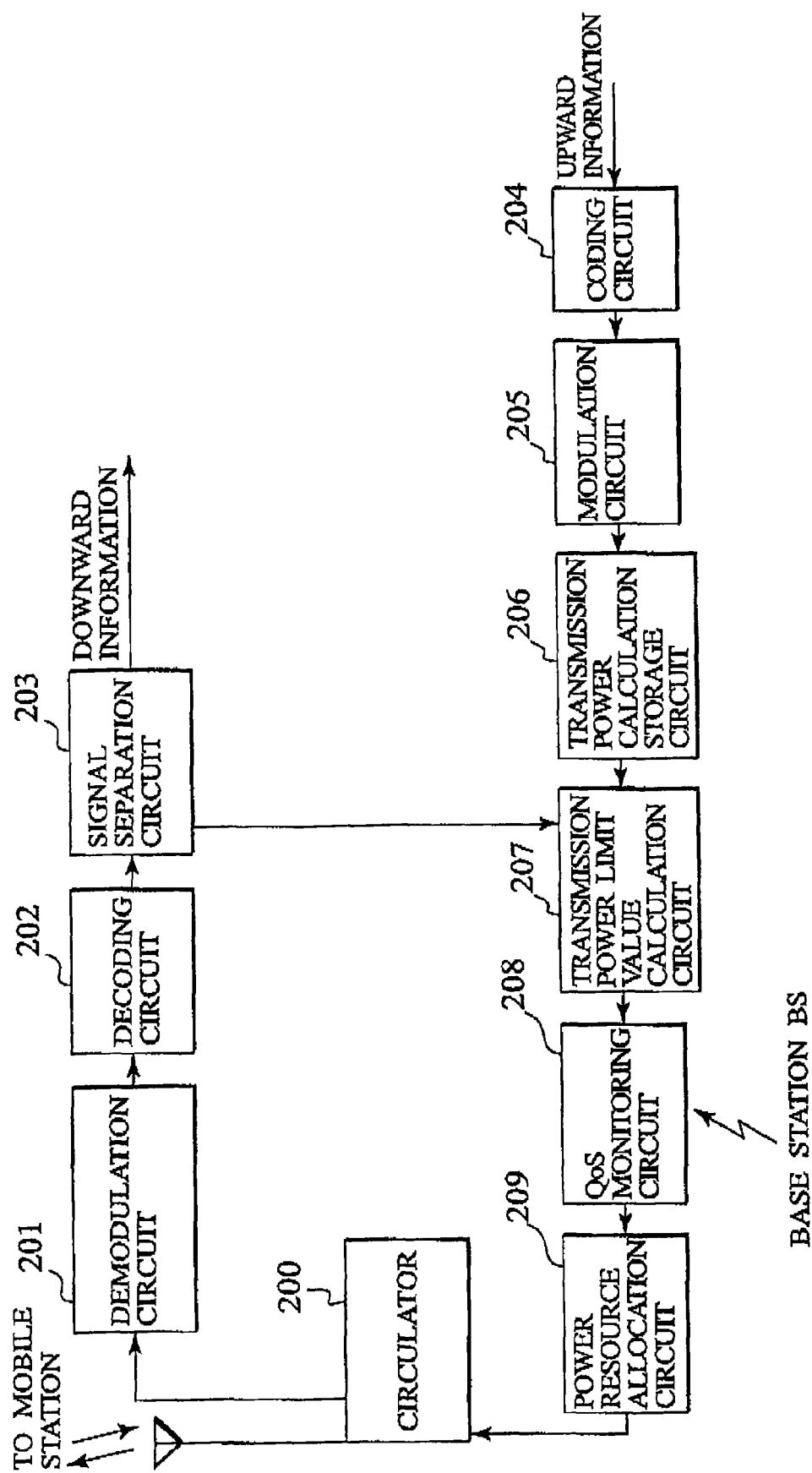

FIG. 14

| TRAFFIC LOAD (PROPORTION OF AVERAGE TRANSMISSION POWER IN MAXIMUM AVAILABLE TRANSMISSION POWER) | TRANSMISSION POWER LIMIT VALUE $PO\_max$ IN NEXT STEP PERIOD |
|---|---|
| 0~1/3 | 1/10 * MAXIMUM AVAILABLE TRANSMISSION POWER |
| 1/3~2/3 | 2/10 * MAXIMUM AVAILABLE TRANSMISSION POWER |
| 2/3~1 | 3/10 * MAXIMUM AVAILABLE TRANSMISSION POWER |

FIG. 15

| PROPORTION OF INTERFERENCE LEVEL OF BASE STATION IN MAXIMUM INTERFERENCE LEVEL | IDENTIFICATION SIGNAL INDICATING INTERFERENCE LEVEL | TRANSMISSION POWER LIMIT VALUE IN NEXT STEP PERIOD IN MOBILE STATION |
|---|---|---|
| 0~1/3 | 1 | 1/10 * MAXIMUM AVAILABLE TRANSMISSION POWER |
| 1/3~2/3 | 2 | 2/10 * MAXIMUM AVAILABLE TRANSMISSION POWER |
| 2/3~1 | 3 | 3/10 * MAXIMUM AVAILABLE TRANSMISSION POWER |

PACKET COMMUNICATION SYSTEM, PACKET COMMUNICATION METHOD, BASE STATION, MOBILE STATION, CONTROL DEVICE, AND PACKET COMMUNICATION PROGRAM

CROSS REFERENCE TO RELATED APPLICATION

This application is a divisional and claims the benefit of priority under 35 U.S.C. §120 from U.S. application Ser. No. 10/515,628, filed Dec. 6, 2004 which is a National Stage of International Application No. PCT/JP03/07210, filed on Jun. 6, 2003 and claims the benefit of priority under 35 U.S.C. §119 of Japanese Patent Application No. 2002-166263, filed on Jun. 6, 2002.

TECHNICAL FIELD

The present invention relates to a packet communications system, a packet communications method, a base station, a mobile station, a control device and a packet communications program, all of which are for performing packet communications through a radio link established between a transmitting station and a receiving station.

BACKGROUND ART

In a conventional packet communications system, upon receipt of a packet addressed to a mobile station, a base station allocates radio resources (power resources and the like) up to maximum available transmission power of the base station, and transmits the packet to the mobile station. For example, in a CDMA system, upon receipt of a packet addressed to a mobile station, a base station allocates code resources up to maximum available transmission power of the base station, and transmits the packet to the mobile station.

In the conventional packet communications system as described above, when packets arrive at a base station in a burst way, transmission power of packets in the base station significantly fluctuates temporally. Thus, fluctuation of an interference level (interference power) in a mobile station belonging to another cell becomes large.

FIG. 1 shows a schematic configuration of a conventional packet communications system in a downlink. In this drawing, it is assumed that a base station BS1 controls a cell (area) "A" and communicates with mobile stations MS1 and MS3 which are located in this cell "A", and a base station BS2 controls a cell "B" and communicates with a mobile station MS2 which is located in this cell "B". Description will be given below while focusing on reception situations in the mobile station MS2.

In a packet communications system performing transmission power control (TPC), based on an interference level received by a receiving station in an immediately preceding slot, transmission power of packets of a transmitting station in a next slot is determined so as to have a target SIR (signal-to-interference power ratio) which is obtained by adding a TPC margin to a required SIR of the receiving station.

For example, in the packet communications system performing the transmission power control, as shown in FIG. 2C, based on an interference level received by the mobile station MS2 in a slot 1 (see FIG. 2B), transmission power of a packet addressed to the mobile station MS2 in the base station BS2 is determined so as to have a target SIR (for example, 4 dB) which is obtained by adding a TPC margin (for example, 1 dB) to a required SIR (for example, 3 dB).

However, as shown in FIG. 2A, when a large quantity of packets arrive at the base station BS1 in a slot 2, the base station BS1 allocates code resources up to maximum available transmission power of the base station BS1. Thus, compared to total transmission power of the base station BS1 in the slot 1, total transmission power of the base station BS1 in the slot 2 is drastically increased. As a result, as shown in FIG. 2B, the interference level in the mobile station MS2 from the base station BS1 is rapidly increased in the slot 2. Therefore, as shown in FIG. 2D, in the mobile station MS2, an SIR of a received signal falls below the required SIR to cause packet reception failure.

As described above, the conventional packet communications system described above has a drawback in that, regardless of the TPC margin, the rapid increase of the interference level in the receiving station due to burstiness of packets causes the packet reception failure in many cases. Moreover, there is a drawback in that such packet reception failure deteriorates a communications quality and decreases a system capacity.

DISCLOSURE OF THE INVENTION

The present invention was made in consideration of the above circumstances. It is an object of the present invention to provide a packet communications system, a packet communications method, a base station, a mobile station, a control device and a packet communications program, which are capable of improving satisfaction rate with a system capacity and a quality of service (QoS) by dynamically limiting transmission power of packets in a transmitting station and keeping an increase of an interference level in a receiving station belonging to another cell within a TPC margin.

In order to achieve the foregoing object, a first aspect of the present invention is summarized as a packet communications system which performs packet communications through a radio link established between a transmitting station and a receiving station. The packet communications system includes a transmission power setter configured to set transmission power of packets in a next step period, by use of transmission power of packets in a preceding step period and an interference level of the receiving station.

Moreover, the first aspect of the present invention is summarized as a packet communications system which performs packet communications through a radio link established between a base station and a mobile station. The packet communications system includes: step setting means for changing transmission power for each of step periods of a predetermined length when one or a plurality of packets are transmitted in the radio link; and transmission power limiting means for setting transmission power in a next step period by use of transmission power in a preceding step period and an interference level for the mobile station.

A second aspect of the present invention is summarized as a packet communications method for performing packet communications through a radio link established between a transmitting station and a receiving station. The packet communications method includes setting transmission power of packets in a next step period by use of transmission power of packets in a preceding step period and an interference level of the receiving station.

Moreover, the second aspect of the present invention is summarized as a packet communications method for performing packet communications through a radio link established between a base station and a mobile station. The packet communications method includes: a step (1) of changing transmission power for each of step periods of a predetermined length when one or a plurality of packets are transmitted in the radio link; and a step (2) of setting transmission power in a next step period by use of transmission power in a preceding step period and an interference level for the mobile station.

A third aspect of the present invention is summarized as a base station which performs packet communications through a radio link established between the base station and a mobile station. The base station includes a transmission power setter configured to set transmission power of packets in a next step period by use of transmission power of packets in a preceding step period and an interference level of the mobile station.

Moreover, the third aspect of the present invention is summarized as a base station which performs packet communications through a radio link established between the base station and a mobile station. The base station includes: step setting means for changing transmission power for each of step periods of a predetermined length when one or a plurality of packets are transmitted in the radio link; and transmission power limiting means for setting transmission power in a next step period by use of transmission power in a preceding step period and an interference level for the mobile station.

A fourth aspect of the present invention is summarized as a mobile station which performs packet communications through a radio link established between the mobile station and a base station. The mobile station includes: an interference level average value obtainer configured to obtain an average value of interference levels received by the base station in a preceding fixed period through an announcement signal from the base station; and a transmission power setter configured to set transmission power of packets in a next step period by use of transmission power of packets in a preceding step period and the average of interference levels.

Moreover, the fourth aspect of the present invention is summarized as a mobile station which performs packet communications through a radio link established between the mobile station and a base station. The mobile station includes: interference level obtaining means for obtaining an average level of interference received by the base station in an immediately preceding fixed period of time in order to change transmission power at the base station side for each of step periods of a predetermined length when one or a plurality of packets are transmitted in the radio link, the average level being obtained through an announcement signal from the base station; and transmission power limiting means for setting transmission power in a next step period by use of transmission power in a preceding step period and the obtained interference level.

A fifth aspect of the present invention is summarized as a control device which controls packet communications performed through a radio link established between a transmitting station and a receiving station. The control device includes a transmission power setter configured to set transmission power of packets in a next step period by use of transmission power of packets in a preceding step period and an interference level of the receiving station.

Moreover, the fifth aspect of the present invention is summarized as a control device which controls each base station which performs packet communications through a radio link established between the base station and a mobile station. The control device includes: step setting means for changing transmission power for each of step periods of a predetermined length when one or a plurality of packets are transmitted in the radio link; and transmission power limiting means for setting transmission power in a next step period by use of transmission power in a preceding step period and an interference level for the mobile station.

In the fifth aspect of the present invention, it is preferable that a transmission power storage configured to store the transmission power of packets in the preceding step period, and a transmission power limit value calculator configured to calculate a transmission power limit value in the next step period by use of the transmission power of packets stored in the transmission power storage are further included, and the transmission power setter is configured to set the transmission power of packets in the next step period to be smaller than or equal to the transmission power limit value.

Moreover, in the fifth aspect of the present invention, it is preferable that a quality of service monitor configured to monitor a quality of service in the radio link is further included, and the transmission power setter is configured to set the transmission power of packets in the next step period to exceed the transmission power limit value within maximum available transmission power of the transmitting station when the quality of service is smaller than or equal to a predetermined value.

Moreover, in the fifth aspect of the present invention, it is preferable that the transmission power setter is configured to set the transmission power of the packets in the next step period in accordance with an interference level of the transmitting station when the transmission power of packets in the preceding step period is 0.

Moreover, in the fifth aspect of the present invention, it is preferable that the transmission power setter is configured to set the transmission power of packets in the next step period based on an average value of interference levels received by the transmitting station in a preceding fixed period.

Moreover, in the fifth aspect of the present invention, it is preferable that the transmission power setter is configured to set the transmission power of packets in the next step period in accordance with an average value of transmission power of packets in a preceding fixed period when the transmission power of packets in the preceding step period is 0.

Moreover, in the fifth aspect of the present invention, it is preferable that the transmission power limiting means includes: transmission power storage means for storing transmission power in each of the step periods; and limit value calculation means for calculating a transmission power limit value in the next step period by use of the transmission power stored in the transmission power storage means, and the transmission power limiting means sets transmission power in the next step period to be smaller than or equal to the transmission power limit value.

Moreover, in the fifth aspect of the present invention, it is preferable that request quality monitoring means for monitoring QoS for the radio link is further included, and the transmission power limiting means has a function of setting the transmission power of packets to exceed a transmission power limit in the step period within maximum transmission power when the QoS is smaller than or equal to a predetermined value.

Moreover, in the fifth aspect of the present invention, it is preferable that the transmission power limiting means sets transmission power in the next step period in accordance with an interference level at the base station side when transmission power in the step period is 0.

Moreover, in the fifth aspect of the present invention, it is preferable that interference level announcement means for informing the mobile station of an average level of interference received by the base station in an immediately preceding fixed period of time by use of an announcement signal to the mobile station from the base station is further included, and the transmission power limiting means has a function of setting the transmission power based on announcement from the interference level announcement means.

Moreover, in the fifth aspect of the present invention, it is preferable that the transmission power limiting means sets transmission power in the next step period in accordance with average transmission power of the base station before a fixed period of time when transmission power in the step period is 0.

A sixth aspect of the present invention is summarized as a packet communications program which performs packet communications through a radio link established between a transmitting station and a receiving station. The program allows a computer to execute processing of setting transmission power of packets in a next step period by use of transmission power of packets in a preceding step period and an interference level of the receiving station.

Moreover, the sixth aspect of the present invention is summarized as a packet communications program which performs packet communications through a radio link established between a base station and a mobile station. The packet communications program allows a computer to execute processing which includes: a step (1) of changing transmission power for each of step periods of a predetermined length when one or a plurality of packets are transmitted in the radio link; and a step (2) of setting transmission power in a next step period by use of transmission power in a preceding step period and an interference level for the mobile station.

A seventh aspect of the present invention is summarized as a control device which controls packet communications performed through a radio link established between a transmitting station and a receiving station. The control device includes a resource allocator configured to allocate a radio resource in a next step period by use of total reception power of packets from the transmitting station in a preceding step period and the quantity of packets accumulated in the transmitting station.

An eighth aspect of the present invention is summarized as a base station which performs packet communications through a radio link established between the base station and a mobile station. The base station includes a resource allocator configured to allocate a radio resource in a next step period by use of total reception power of packets from the mobile station in a preceding step period and the quantity of packets accumulated in the mobile station.

A ninth aspect of the present invention is summarized as a packet communications program which performs packet communications through a radio link established between a transmitting station and a receiving station. The program allows a computer to execute processing of allocating a radio resource in a next step period by use of total reception power of packets from the transmitting station in a preceding step period and the quantity of packets accumulated in the transmitting station.

BRIEF DESCRIPTION OF THE DRAWINGS

FIG. 7 is a block diagram showing an internal configuration of the base station according to the first embodiment of the present invention.

FIG. 10 is an explanatory diagram showing an overview of a mobile station according to the second embodiment of the present invention.

FIG. 14 is a table used for determining a transmission power limit value in a next step period in the packet communications system according to the first embodiment of the present invention.

FIG. 15 is a table used for determining a transmission power limit value in a next step period in the packet communications system according to the second embodiment of the present invention.

BEST MODES FOR CARRYING OUT THE INVENTION

First Embodiment (Overview of Packet Communications System and Packet Communications Method According to this Embodiment)

Figure 1:
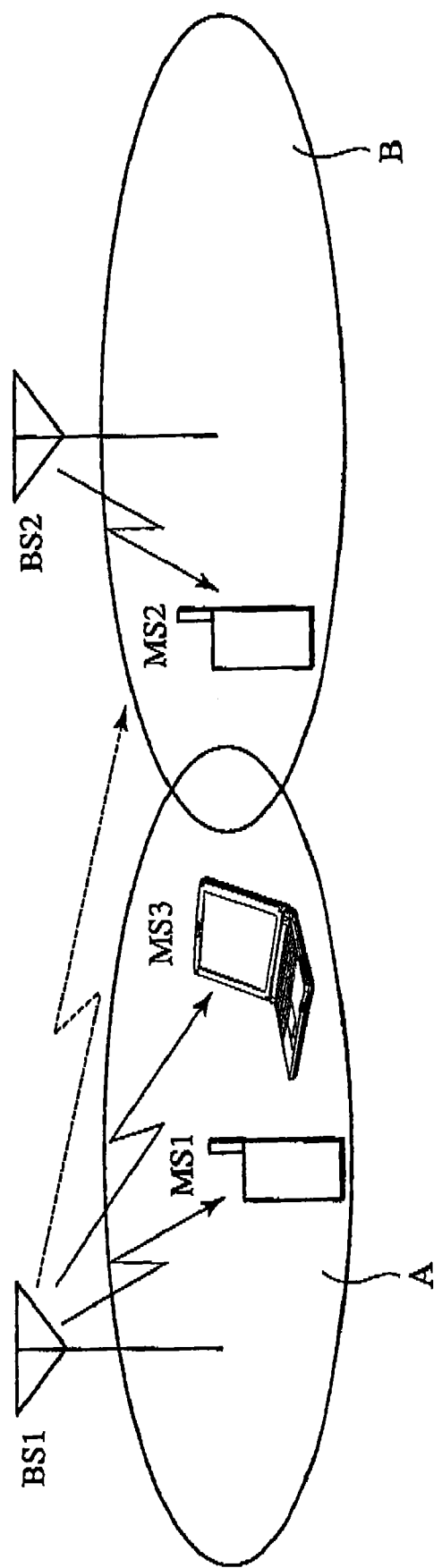
FIG. 1 is a schematic diagram showing an overview of a conventional packet communications system.
Figure 2A:
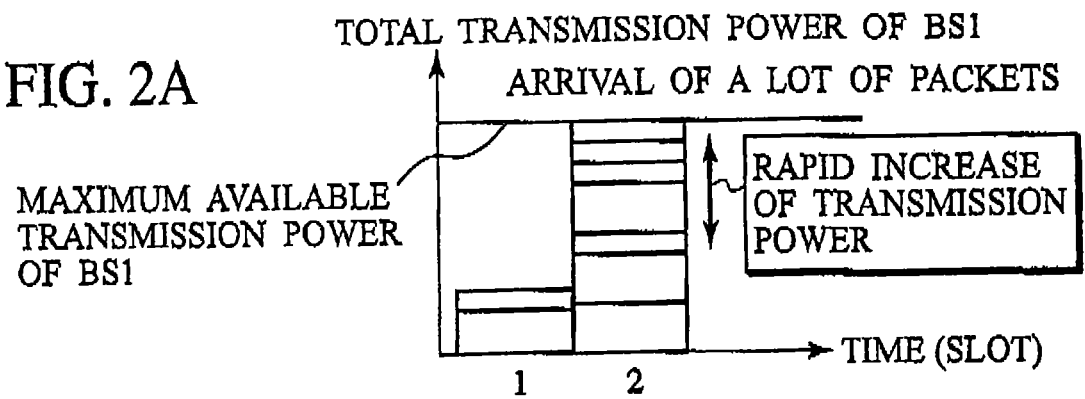
FIG. 2A is a graph showing total transmission power of a base station BS1 for each period of time (slot) in a downlink in the conventional packet communications system.
Figure 2B:
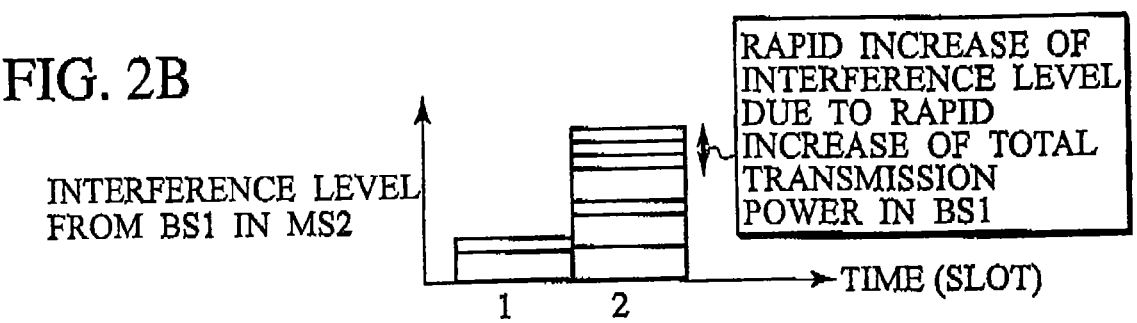
FIG. 2B is a graph showing an interference level of a mobile station MS2 for each period of time (slot) in the downlink in the conventional packet communications system.
Figure 2C:
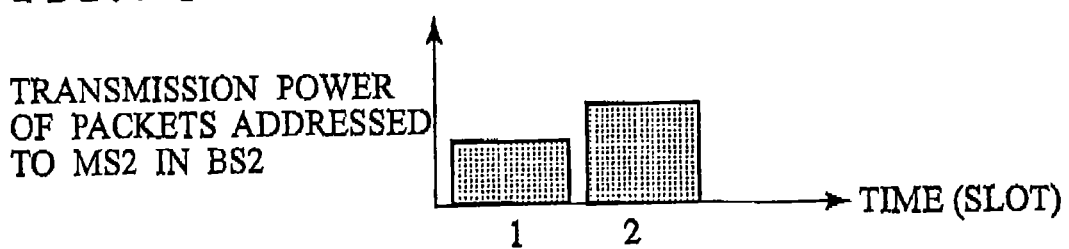
FIG. 2C is a graph showing transmission power of a packet addressed to the mobile station MS2 in a base station BS2 for each period of time (slot) in the downlink in the conventional packet communications system.
Figure 2D:
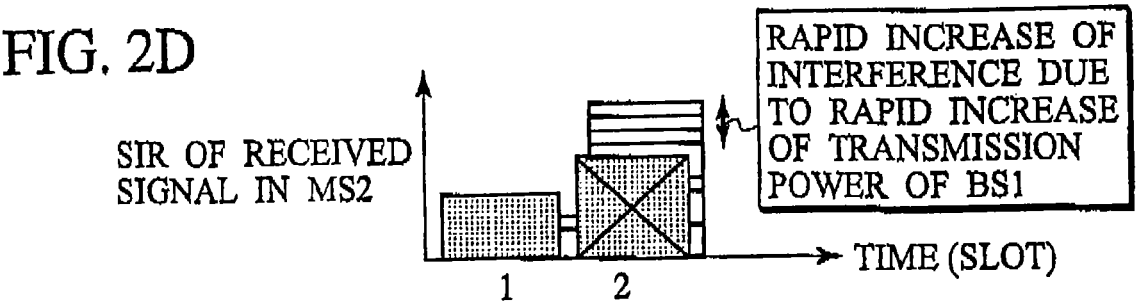
FIG. 2D is a graph showing an SIR of a received signal in the mobile station MS2 for each period of time (slot) in the downlink in the conventional packet communications system.
Figure 3:
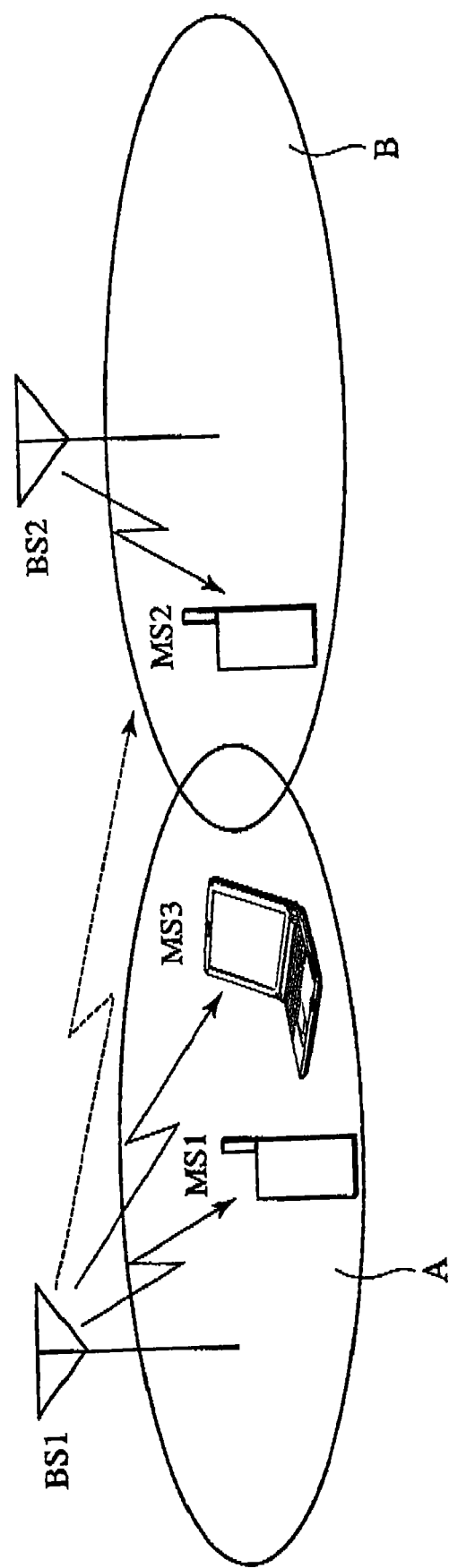
FIG. 3 is an explanatory diagram showing an overview of a packet communications system according to a first embodiment of the present invention.

Detailed description will be given below of a packet communications system and a packet communications method according to a first embodiment of the present invention. FIG. 3 is an explanatory view showing an overview of the packet communications system according to this embodiment.

Note that, in the packet communications system according to this embodiment, a base station (transmitting station) BS2 controls transmission power of packets addressed to a mobile station (receiving station) MS2 in a downlink (a direction toward the mobile station MS2 from the base station BS2).

Figure 4:
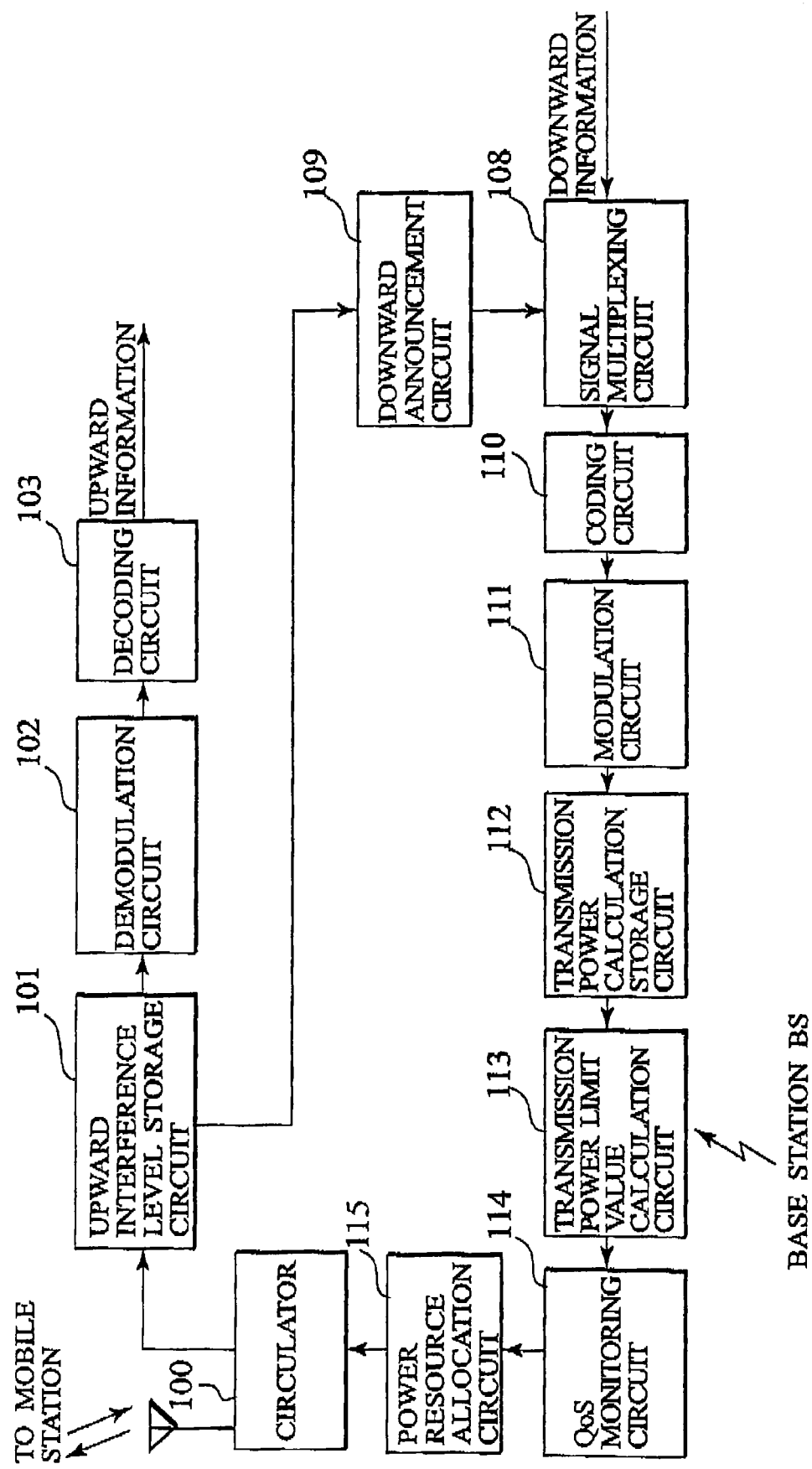
FIG. 4 is an explanatory diagram showing an overview of a base station according to the first embodiment of the present invention.

As shown in FIG. 3, in the packet communications system according to this embodiment, a base station BS1 controlling a cell "A" and the base station BS2 controlling a cell "B" adjacent to the cell "A" are disposed. Mobile stations MS1 and MS3 are located in the cell "A" and the mobile station MS2 is located in the cell "B". FIG. 4 shows a schematic configuration of the base stations BS1 and BS2 according to this embodiment.

In the case where a large quantity of packets arrive at the base station BS1, the base station BS1 determines a transmission power limit value in a next slot when transmitting packets from a transmission buffer via the downlink (downward channel). Specifically, the base station BS1 determines the transmission power limit value in accordance with transmission power and a TPC margin in a preceding slot (a step period of a predetermined length) so as not to significantly increase an interference level in the mobile station MS2 belonging to the other cell "B".

Figure 5A:
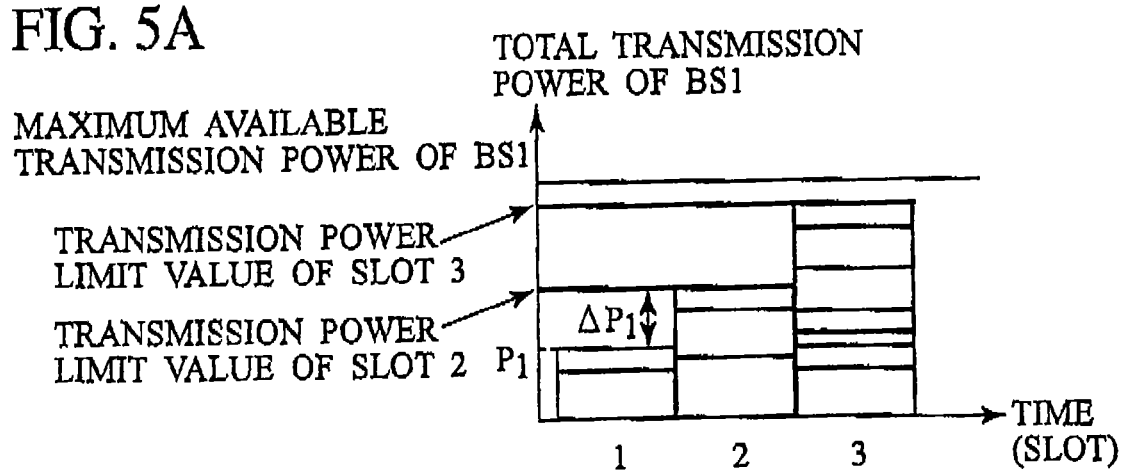
FIG. 5A is a graph showing total transmission power of a base station BS1 for each period of time (slot) in a downlink in the packet communications system according to the first embodiment of the present invention.

To be more specific, as shown in FIG. 5A, the base station BS1 increases (changes) the transmission power limit value in stages for each period of time (slots 1 to 3) within maximum available transmission power of the base station BS1.

Figure 5B:
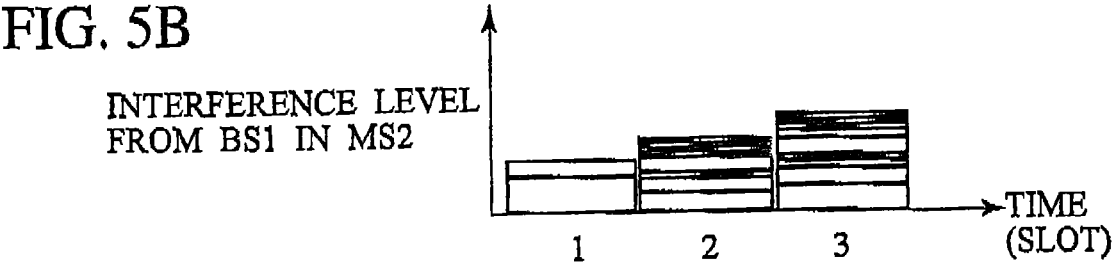
FIG. 5B is a graph showing an interference level of a mobile station MS2 for each period of time (slot) in the downlink in the packet communications system according to the first embodiment of the present invention.
Figure 5C:
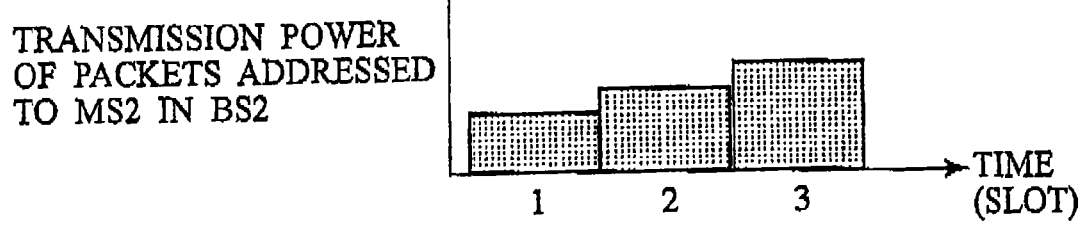
FIG. 5C is a graph showing transmission power of a packet addressed to the mobile station MS2 in a base station BS2 for each period of time (slot) in the downlink in the packet communications system according to the first embodiment of the present invention.

Consequently, as shown in FIG. 5B, the interference level in the mobile station MS2 which is located in the cell "B" from the base station BS1 is also increased in stages. Here, as shown in FIG. 5C, in accordance with the interference level of the mobile station MS2 in the slot 1, the base station BS2 determines transmission power of packets addressed to the mobile station MS2 in the slot 2 so as to have a target SIR which is obtained by adding a TPC margin to a required SIR.

Figure 5D:
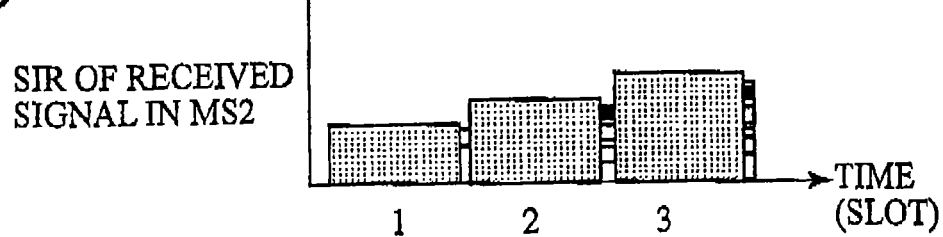
FIG. 5D is a graph showing an SIR of a received signal in the mobile station MS2 for each period of time (slot) in the downlink in the packet communications system according to the first embodiment of the present invention.

Thus, an increase of the interference level in the mobile station MS2 can be suppressed to the TPC margin or less. In addition, as shown in FIG. 5D, a SIR of a received signal in the mobile station MS2 can be increased to be larger than the required SIR, and reception failure can be prevented.

Hereinafter, description will be given of a method for calculating a transmission power limit value for keeping the increase of the interference level in the mobile station MS2 within the TPC margin.

Note that, here, a required SINR in the mobile station MS2 and a TPC margin are expressed as "$SINR_{th}$" and "$TPC_{margin}$", respectively, (both of which are true values, in other words, both of which do not take on values of "dB") and a noise level (noise power) in the mobile station MS2 is expressed as "N". Here, when transmission power of packets (total transmission power) of the base station BS1 in the slot 1 is "$P_1$", an increase of transmission power of packets of the base station BS1 in the slot 2 (that is, a step width) $\Delta P_1$ is calculated.

First, an interference level caused to the mobile station MS2 by the total transmission power of the base station BS1 is considered. Here, it is assumed that an interference level caused to the mobile station MS2 by the total transmission power $P_1$ of the base station BS1 in the slot 1 is "I", and an increase of the interference level in the mobile station MS2 is "$\Delta I$" when the transmission power of the base station BS1 is increased by "$\Delta P_1$" in the slot 2.

Based on the required SINR of the mobile station MS2, the TPC margin and the noise level in the slot 1, the base station BS1 using the transmission power control calculates desired wave signal power S in the slot 2, as shown in the following expression. Specifically, the desired wave signal power S is calculated as below.

$$S = (SINR_{th} \times TPC_{margin})(N+I)$$

Moreover, based on the calculated desired wave signal power S and the interference level in the slot 2, the base station BS1 calculates an SINR in the slot 2, as shown in the following expression.

$$\frac{S}{N+I+\Delta I} = \frac{(SINR_{th} \times TPC_{margin})(N+I)}{N+I+\Delta I}$$

Accordingly, as a result of this calculation, if the SINR is equal to $SINR_{th}$ or more, the mobile station MS2 succeeds in packet reception in the slot 2. Specifically, in order for the mobile station MS2 to succeed in the packet reception in the slot 2, it is required to satisfy the following condition.

$$\frac{(SINR_{th} \times TPC_{margin})(N+I)}{N+I+\Delta I} \geq SINR_{th}$$

As a result, the following expression is established.

$$\frac{\Delta I}{I} \leq \frac{(SINR_{th} \times TPC_{margin})\left(1+\frac{N}{I}\right)}{SINR_{th}} - 1 - \frac{N}{I}$$

Here, the noise level N is extremely small as compared to the interference level I. Thus, in the above expression, the term "N/I" can be regarded as "0". Moreover, since "$\Delta I/I$" in the mobile station MS2 is equal to "$\Delta P_1/P_1$" in the base station BS1, the above expression can be transformed as below.

$$\frac{\Delta P_1}{P_1} \leq \frac{SINR_{th} \times TPC_{margin}}{SINR_{th}} - 1$$

The above expression can be further transformed as below.

$$\frac{\Delta P_1}{P_1} \leq TPC_{margin} - 1$$

From the above expression, for the total transmission power $P_1$ of the base station BS1 in the slot 1, a maximum value $\Delta P_1$ of the total transmission power of the base station BS1, which can be increased in the slot 2, can be calculated.

Moreover, a transmission power limit value of the base station BS1 in the slot 2 can be calculated from the following expression.

$$\Delta P_1 + P_1 = (TPC_{margin} - 1) \times P_1 + P_1 = TPC_{margin} \times P_1$$

For example, when the required SINR ($SINR_{th}$)=2 (3 dB) and $TPC_{margin}$=1.26 (1 dB), $\Delta P_i$=0.26 $P_i$. Specifically, the transmission power limit value of the base station BS1 in the slot 2 is 1.26 $P_1$.

By use of $\Delta P_i$ which is calculated as described above, in the slot 2, the base station BS1 allocates and transmits transmission power of packets by using "$P_1+\Delta P_1$" as the transmission power limit value.

As to the next slot and subsequent slots, the base station BS1 calculates a transmission power limit value "$P_i+\Delta P_i$" in a slot (i+1) from transmission power of packets in a slot i. The maximum value of the total transmission power of the base station BS1, which can be increased, is set to "$\Delta P_i$" as described above. Thus, it is possible to avoid a rapid increase of the interference level in the mobile station MS2 belonging to the other cell "B".

Note that, when total transmission power in an immediately preceding slot is small, a maximum value of the total transmission power, which can be increased in a next slot, is limited. Thus, a packet transmission delay occurs.

In order to avoid such an adverse effect, in this embodiment, the base station BS1 can transmit packets regardless of the transmission power limit value, for example, by referring to a packet delay and quality of service (QoS) such as buffering time.

Figure 6A:
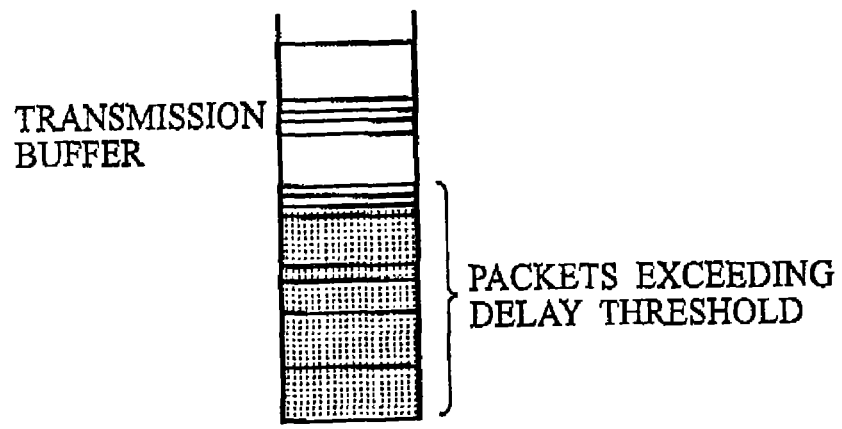
FIG. 6A is a view showing a state of transmitting packets while exceeding a transmission power limit value in the packet communications system according to the first embodiment of the present invention.
Figure 6B:
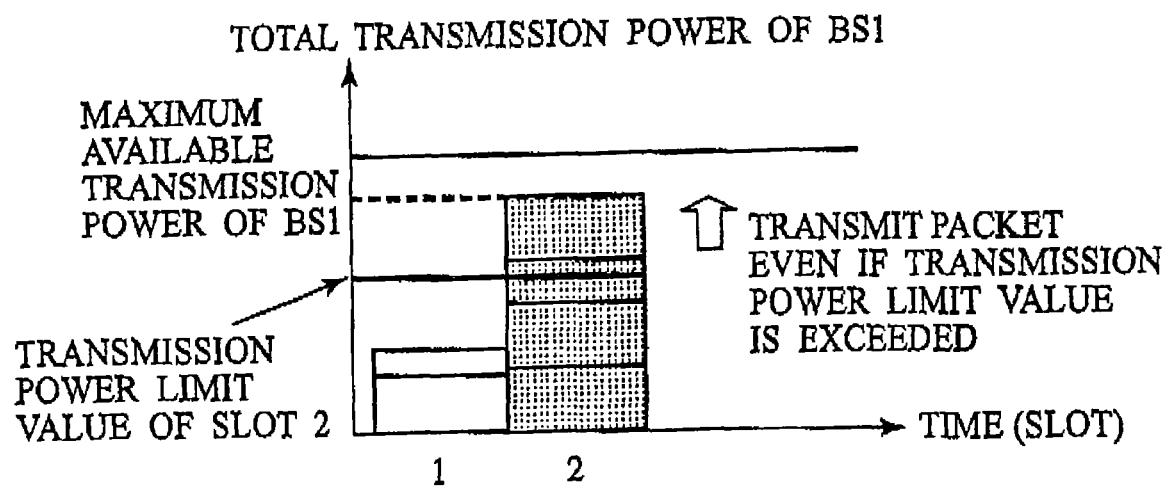
FIG. 6B is a graph showing total transmission power of a base station BS1 for each period of time (slot) in a downlink in the packet communications system according to the first embodiment of the present invention.

For example, as shown in FIG. 6A, a bound "$P_i+\Delta P_i$" is provided as the transmission power limit value of the base station BS1 in the slot 2. Then, when there is a packet exceeding a predetermined delay threshold, as shown in FIG. 6B, the base station BS1 can repeat packet transmission processing (ignore the bound of the transmission power limit value in the slot 2) before transmitting the packet exceeding the delay threshold, within the maximum available transmission power of the base station BS1.

Moreover, when transmission power of packets in a preceding slot is "0", the base station BS1 determines a transmission power limit value in a next slot as below. Here, when the transmission power of packets in the preceding slot is smaller than a predetermined threshold, the base station BS1 may determine the transmission power of packets to be "0".

To be more specific, when traffic is empty, the interference level in the mobile station MS2 belonging to the cell "B", which is different from the cell "A" controlled by the base station BS1, is low. Thus, even if the increase $\Delta P_i$ of the transmission power of packets in the base station BS1 is small, the interference level exceeding the TPC margin is more likely to be caused in the mobile station MS2.

On the contrary, when the traffic is busy, the interference level in the mobile station MS2 belonging to the cell "B" is high. Thus, even if the increase $\Delta P_i$ of the transmission power of packets in the base station BS1 is large, the required SIR is satisfied in the mobile station MS2 and reception of packets from the base station BS2 is more likely to be successful.

Therefore, it is required to determine the increase $\Delta P_i$ of the transmission power of packets in the next step period in accordance with the interference level in the mobile station MS2, that is, how busy the traffic is.

In this embodiment, when transmission power of packets in a preceding step period is "0", the base station BS1 can determine the transmission power of packets in a next step period in accordance with a proportion occupied by an average value of transmission power of packets in a certain period in the maximum available transmission power $P_{max}$ of the base station BS1.

For example, as shown in FIG. 14, when the proportion of the average value of the transmission power of packets (average transmission power) in a certain period of time (for example, n frames) in the maximum available transmission power (traffic load) is "0 to ⅓", "⅓ to ⅔" or "⅔ to 1", a transmission power limit value PO_max in the next step period is set to "1/10", "2/10" or "3/10" of the maximum available transmission power of the base station BS1, respectively.

(Configuration of Base Station According to this Embodiment)

In order to realize the packet communications system according to this embodiment, the base stations BS1 and BS2 have a configuration as below. Since the base stations BS1 and BS2 include basically the same functions, the base station BS2 will be described below. FIG. 7 is a block diagram showing the configuration of the base station BS1 according to this embodiment.

As shown in FIG. 7, as uplink (upward direction) processing means, the base station BS2 includes an upward interference level storage circuit 101, a demodulation circuit 102, a decoding circuit 103 and a signal separation circuit 116.

The upward interference level storage circuit 101 is a storage device configured to detect and store interference levels in the uplink to the base station BS2 from the mobile stations MS1 to MS3. The interference levels stored in this upward interference level storage circuit 101 are outputted to a downward announcement circuit 109.

The demodulation circuit 102 is an arithmetic circuit configured to demodulate an upward signal obtained via the uplink, and the decoding circuit 103 is an arithmetic circuit configured to produce upward information by decoding the demodulated upward signal.

The signal separation circuit 116 is configured to separate an interference level in the mobile station MS2 from the upward information, and to output the interference level to a transmission power limit value calculation circuit 113.

Moreover, as downlink (downward direction) processing means, the base station BS2 includes a transmission buffer 117, the downward announcement circuit 109, a signal multiplexing circuit 108, a coding circuit 110, a modulation circuit 111, a transmission power calculation storage circuit 112, the transmission power limit value calculation circuit 113, a QoS monitoring circuit 114 and a resource allocation circuit 115.

Here, in the base station BS2, the signal multiplexing circuit 108, the coding circuit 110 and the modulation circuit 111 are included in a packet transmission circuit 214.

An upward interference level from the upward interference power level storage circuit 101 is inputted to the signal multiplexing circuit 108 via the downward announcement circuit 109, and multiplexed with downward information. Thereafter, the upward interference level is transmitted to the mobile station MS2 as a downward signal via the coding circuit 110, the modulation circuit 111 and a circulator 115.

The transmission buffer 117 is configured to accumulate downward information (for example, packets) addressed to a mobile station (for example, MS2) which is located in the cell "B" controlled by the base station BS2.

The downward announcement circuit 109 is a circuit configured to inform predetermined mobile stations MS1 to MS3 of an interference level in the base station BS2, which is obtained from the upward interference level storage circuit 101. The downward announcement circuit 109 multiplexes an identification signal indicating the interference level into an announcement signal in the signal multiplexing circuit 108.

The signal multiplexing circuit 108 is a circuit configured to multiplex many pieces of downward information accumulated in the transmission buffer 117 and the announcement signal generated by the downward announcement circuit 109 for each of predetermined time slots.

The coding circuit 110 is a circuit configured to code a signal multiplexed by the signal multiplexing circuit 108.

The modulation circuit 111 is a circuit configured to modulate the signal coded by the coding circuit 110, by use of a radio resource (for example, transmission power of packets, a code resource and the like) which is allocated by the resource allocation circuit 115.

The transmission power calculation storage circuit 112 is a circuit configured to store transmission power of packets in each of step periods (for example, slots) of a predetermined length. Specifically, the transmission power calculation storage circuit 112 is configured to store transmission power of packets in a preceding step period, which is allocated by the resource allocation circuit 115.

The transmission power limit value calculation circuit 113 is a circuit configured to play a role of limit value calculation means for calculating a transmission power limit value in the next step period, by use of the transmission power stored in the transmission power calculation storage circuit 112 (the transmission power in the preceding step period).

Moreover, when the transmission power of packets in the preceding step period is "0", the transmission power limit value calculation circuit 113 refers to the transmission power calculation storage circuit 112, and calculates the transmission power limit value in the next step period based on an average value of transmission power of packets in a preceding fixed period.

Meanwhile, when the transmission power in the preceding step period is "0" or more, the transmission power limit value calculation circuit 113 calculates the transmission power limit value in the next step period in accordance with the transmission power in the preceding step period.

The QoS monitoring circuit 114 is a quality of service monitor configured to monitor quality of service (QoS) in a radio link, for example, packet delays of packets staying in the transmission buffer 117, buffering time and the like.

The resource allocation circuit 115 is a circuit configured to allocate a radio resource for packet transmission in accordance with respective processing results of the circuits 112 to 114. For example, when transmitting one or a plurality of packets in a predetermined radio link, the resource allocation circuit 115 is configured to change transmission power of each of the packets to be allocated for each of the step periods.

Specifically, the resource allocation circuit 115 constitutes a transmission power setter configured to set transmission power of packets in the next step period, by use of the transmission power of packets in the preceding step period, which is stored in the transmission power calculation storage circuit 112, and the interference level in the mobile station MS2, which is obtained from the signal separation circuit 116.

Moreover, the resource allocation circuit 115 sets the transmission power of packets in the next step period to be smaller than or equal to the transmission power limit value calculated by the transmission power limit value calculation circuit 113, and allocates a radio resource according to the set transmission power of packets.

Moreover, when the QoS in the radio link is smaller than or equal to a predetermined value, the resource allocation circuit 115 sets the transmission power of packets in the next step period to exceed the transmission power limit value calculated by the transmission power limit value calculation circuit 113 within the maximum available transmission power of the base station BS2.

For example, when the QoS monitoring circuit 114 determines that there is a packet exceeding the delay threshold, the resource allocation circuit 115 allocates the radio resource to the packet even if transmission power of the packet exceeds the transmission power limit value in the next step period.

Moreover, the resource allocation circuit 115 may set the transmission power of packets in the next step period based on an average value of interference levels received by the base station BS2 in a preceding fixed period.

The circulator 100 is a switching circuit configured to sort signals transmitted/received between the base station BS2 and the mobile station MS2. The circulator 100 outputs an upward signal received from the mobile station MS2 to the uplink processing circuit, and transmits a downward signal processed by the downlink processing circuit to the mobile station MS2.

(Packet Communications Method According to this Embodiment)

Figure 8:
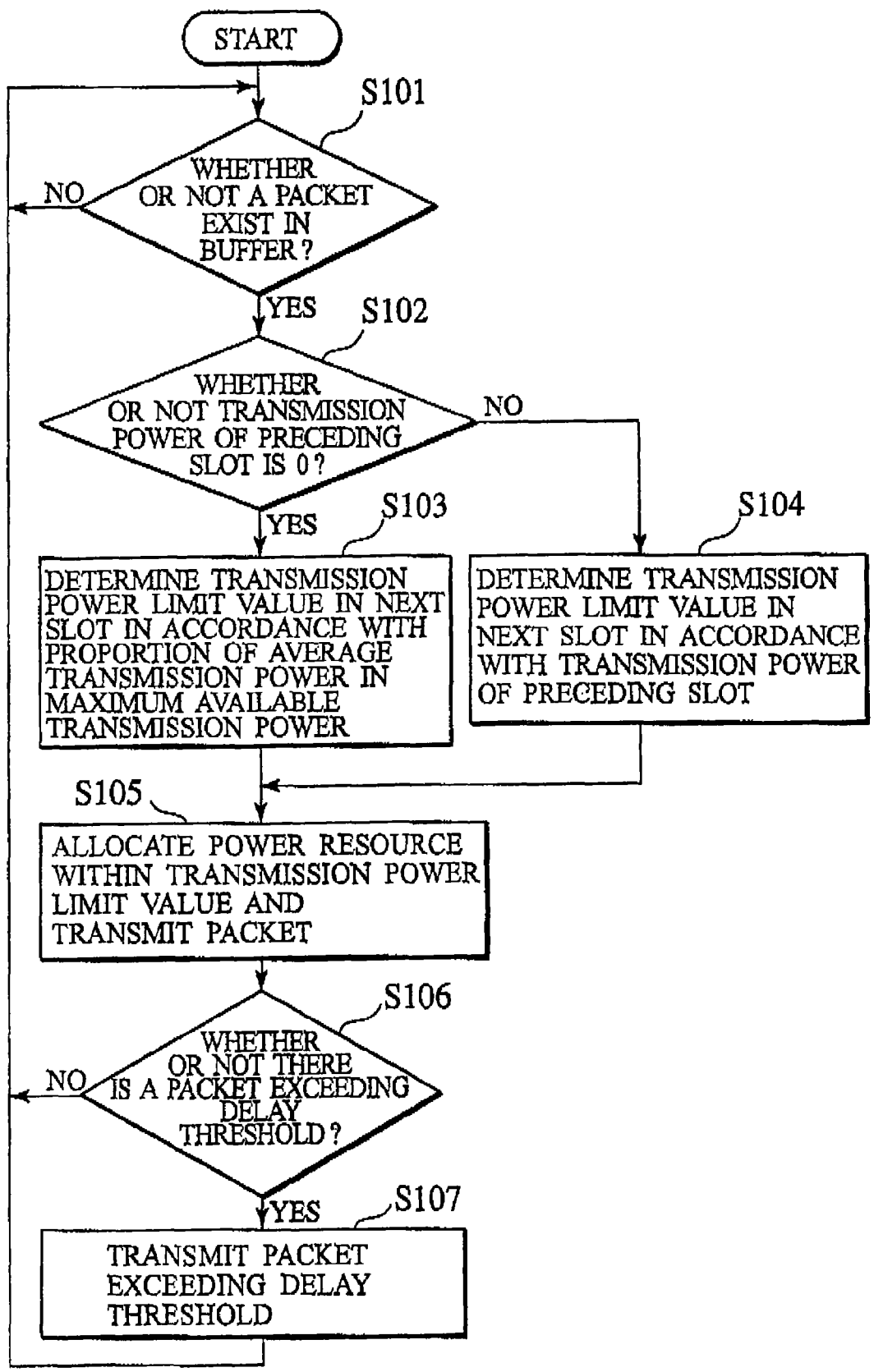
FIG. 8 is a flowchart showing operations of the packet communications system according to the first embodiment of the present invention.

FIG. 8 shows a flowchart of a packet communications method according to this embodiment.

As shown in FIG. 8, in Step S101, the base station BS2 determines whether or not there is a packet addressed to the mobile station MS2 in the transmission buffer 117.

When the base station BS2 determines that there is no packet addressed to the mobile station MS2 in the transmission buffer 117, the base station BS2 becomes a stand-by state until a packet addressed to the mobile station MS2 is accumulated in the transmission buffer 117 by loop processing.

Meanwhile, when the base station BS2 determines that there is a packet addressed to the mobile station MS2 in the transmission buffer 117, the base station BS2 determines, in Step S102, whether or not transmission power of packets (total transmission power) in a preceding slot (step period) is "0".

When the transmission power in the preceding slot is "0", in Step S103, the transmission power limit value calculation circuit 113 of the base station BS2 calculates a transmission power limit value in the next slot by referring to FIG. 14, that is, in accordance with the traffic load (the proportion of the average transmission power in the maximum available transmission power).

Meanwhile, when the transmission power in the preceding slot is determined not to be "0", in Step S104, the transmission power limit value calculation circuit 113 of the base station BS2 decides the transmission power limit value in the next slot in accordance with the transmission power in the preceding slot.

In Step S105, the resource allocation circuit 115 of the base station BS2 allocates radio resources within the transmission power limit value calculated by the transmission power limit value calculation circuit 113, and the packet transmission circuit 118 transmits the packet to the mobile station MS2 by use of the allocated radio resources.

In Step S106, the QoS monitoring circuit 114 determines whether or not there is a packet exceeding a delay threshold in the packets staying in the transmission buffer 117.

When there is the packet exceeding the delay threshold in the transmission buffer 117, in Step S107, the resource allocation circuit 115 allocates the radio resources to these packets until the maximum available transmission power of the base station BS2 is reached, regardless of the transmission power limit value calculated by the transmission power limit value calculation circuit 113.

Meanwhile, when the packet exceeding the delay threshold are determined not to exist in the transmission buffer, the packet communications method according to this embodiment returns to Step S101 and repeats the above-described Steps S101 to S106.

Second Embodiment (Overview of Packet Communications System and Packet Communications Method According to this Embodiment)

Figure 9:
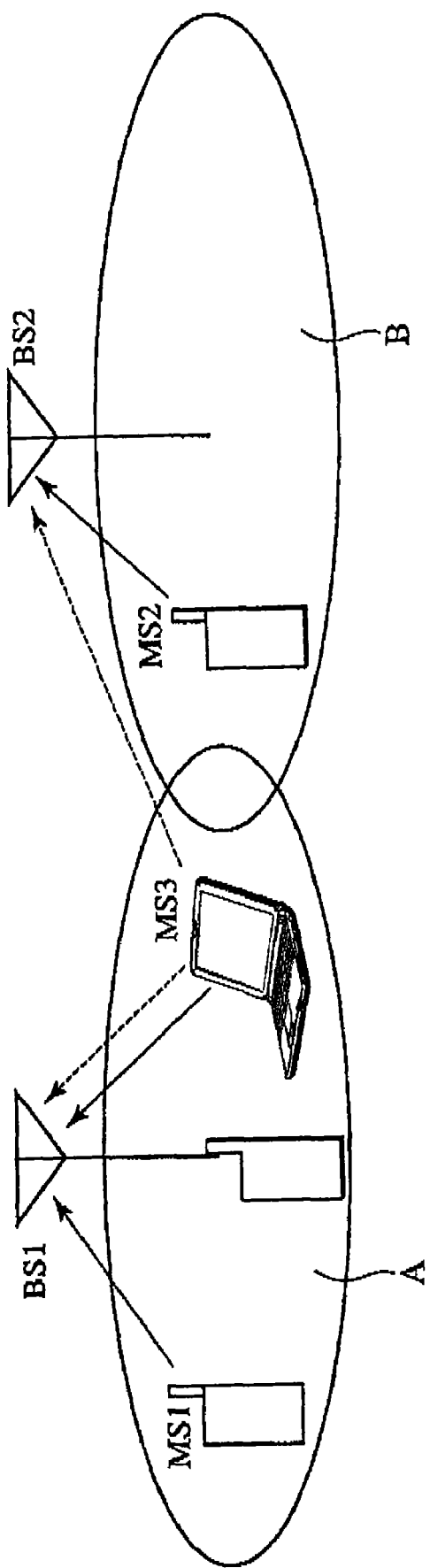
FIG. 9 is an explanatory diagram showing an overview of a packet communications system according to a second embodiment of the present invention.
Figure 11A:
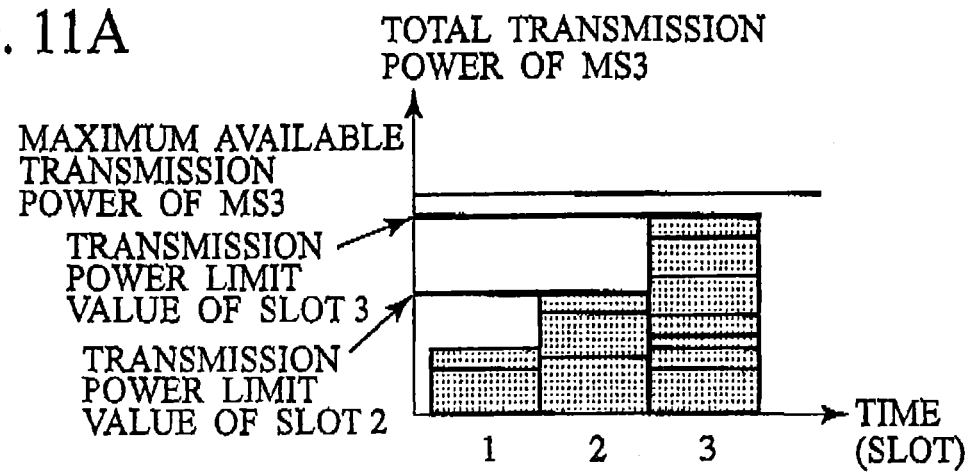
FIG. 11A is a graph showing total transmission power of a mobile station MS3 for each period of time (slot) in an uplink in the packet communications system according to the second embodiment of the present invention.
Figure 11B:
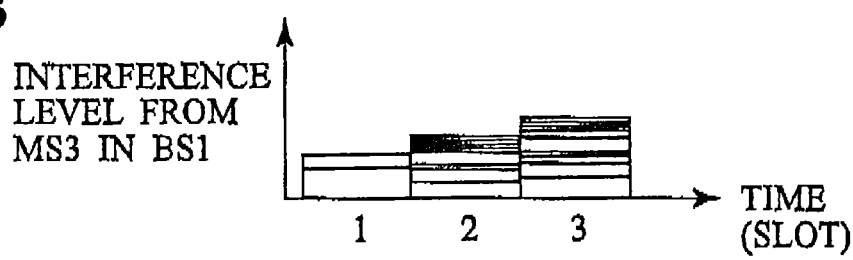
FIG. 11B is a graph showing an interference level of a base station BS1 for each period of time (slot) in the uplink in the packet communications system according to the second embodiment of the present invention.
Figure 11C:
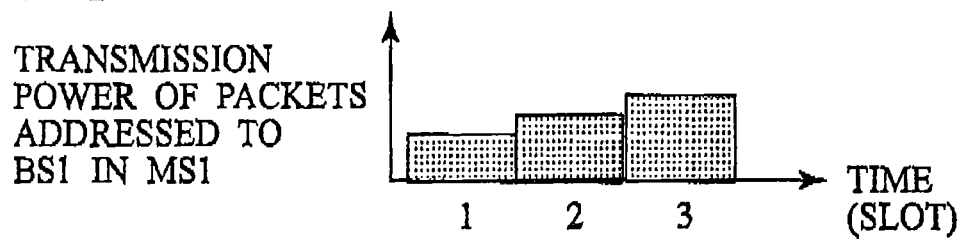
FIG. 11C is a graph showing transmission power of a packet addressed to the base station BS1 in a mobile station MS1 for each period of time (slot) in the uplink in the packet communications system according to the second embodiment of the present invention.
Figure 11D:
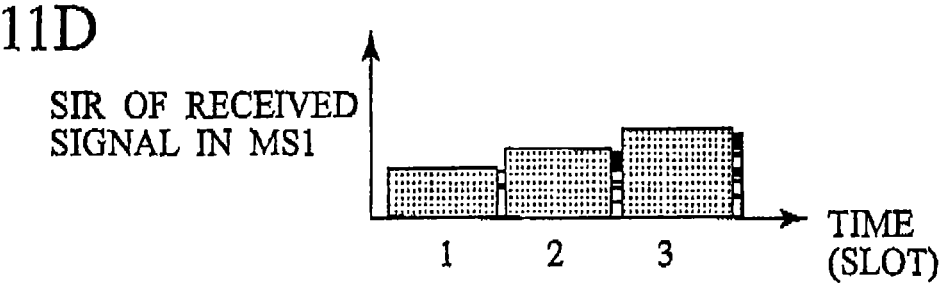
FIG. 11D is a graph showing an SIR of a received signal in the mobile station MS1 for each period of time (slot) in the uplink in the packet communications system according to the second embodiment of the present invention.
Figure 11E:
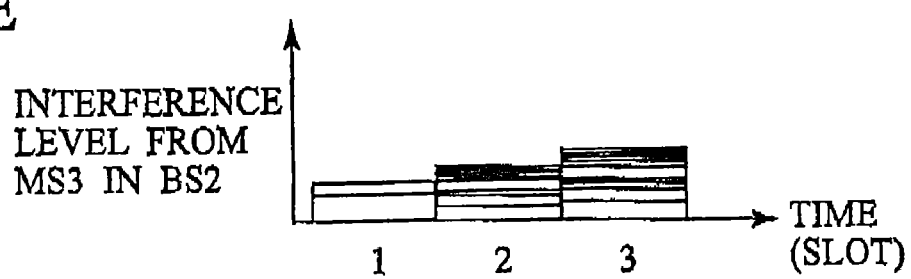
FIG. 11E is a graph showing an interference level of a base station BS2 for each period of time (slot) in the uplink in the packet communications system according to the second embodiment of the present invention.
Figure 11F:
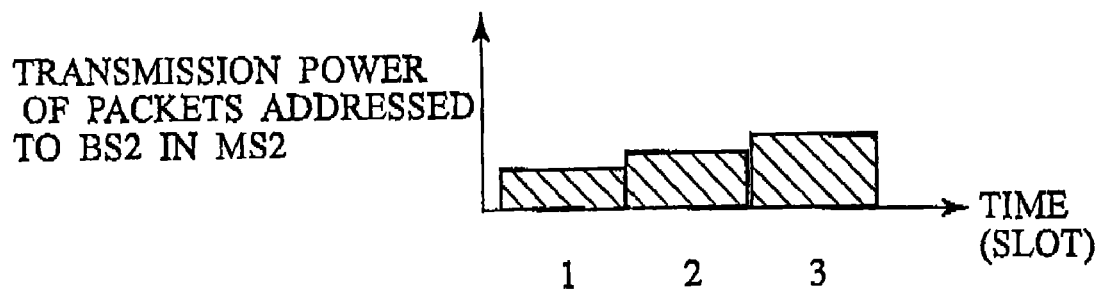
FIG. 11F is a graph showing transmission power of a packet addressed to the base station BS1 in a mobile station MS2 for each period of time (slot) in the uplink in the packet communications system according to the second embodiment of the present invention.
Figure 11G:
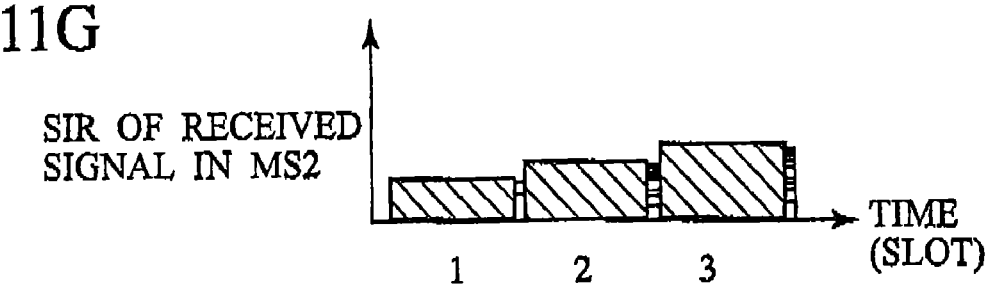
FIG. 11G is a graph showing an SIR of a received signal in the mobile station MS2 for each period of time (slot) in the uplink in the packet communications system according to the second embodiment of the present invention.

Next, detailed description will be given of a packet communications system and a packet communications method according to a second embodiment of the present invention. FIG. 9 is an explanatory view showing an overview of the packet communications system according to this embodiment.

Note that, in the packet communications system according to this embodiment, a mobile station (transmitting station) MS3 is configured to control transmission power of a packet addressed to a base station (receiving station) BS1 in an uplink (a direction toward the base station BS1 from the mobile station MS3).

As shown in FIG. 9, in the packet communications system according to this embodiment, the base station BS1 controlling a cell "A" and a base station BS2 controlling a cell "B" adjacent to the cell "A" are disposed. Mobile stations MS1 and MS3 are located in the cell "A", and a mobile station MS2 is located in the cell "B". FIG. 10 shows a schematic configuration of the mobile stations MS1 to MS3 according to this embodiment.

As shown in FIGS. 11A to 11G, the packet communications system according to this embodiment can prevent packet reception failure in the mobile stations MS1 and MS2, by limiting total transmission power (transmission power of packets) of the mobile station MS3 in stages.

To be more specific, in accordance with transmission power of packets in a preceding slot (for example, a slot 1), the mobile station MS3 decides a transmission power limit value in a next slot (for example, a slot 2).

In this embodiment, a method for deciding the transmission power limit value in the next slot is the same as that of the first embodiment except for the processing in the case where the transmission power of packets in the preceding slot is "0".

Specifically, in the case of this embodiment, the base stations BS1 and BS2 inform the mobile stations MS2 and MS3 of interference levels in the respective base stations BS1 and BS2, by use of downward announcement signals (for example, pilot signals, transmission permission probability announcement signals and the like). Thereafter, the mobile station MS3 decides the transmission power limit value in the next slot in accordance with the informed interference levels.

Here, the base stations BS1 and BS2 inform the mobile stations MS2 and MS3, by use of announcement signals, of "identification signals indicating the interference levels (for example, 1 to 3)" which correspond to "a proportion of the interference levels received by the base stations BS1 and BS2 in a preceding fixed period in a maximum interference level", as "an average value of the interference levels received by the base stations BS1 and BS2 in the preceding fixed period".

(Configuration of Mobile Station According to this Embodiment)

Figure 12:
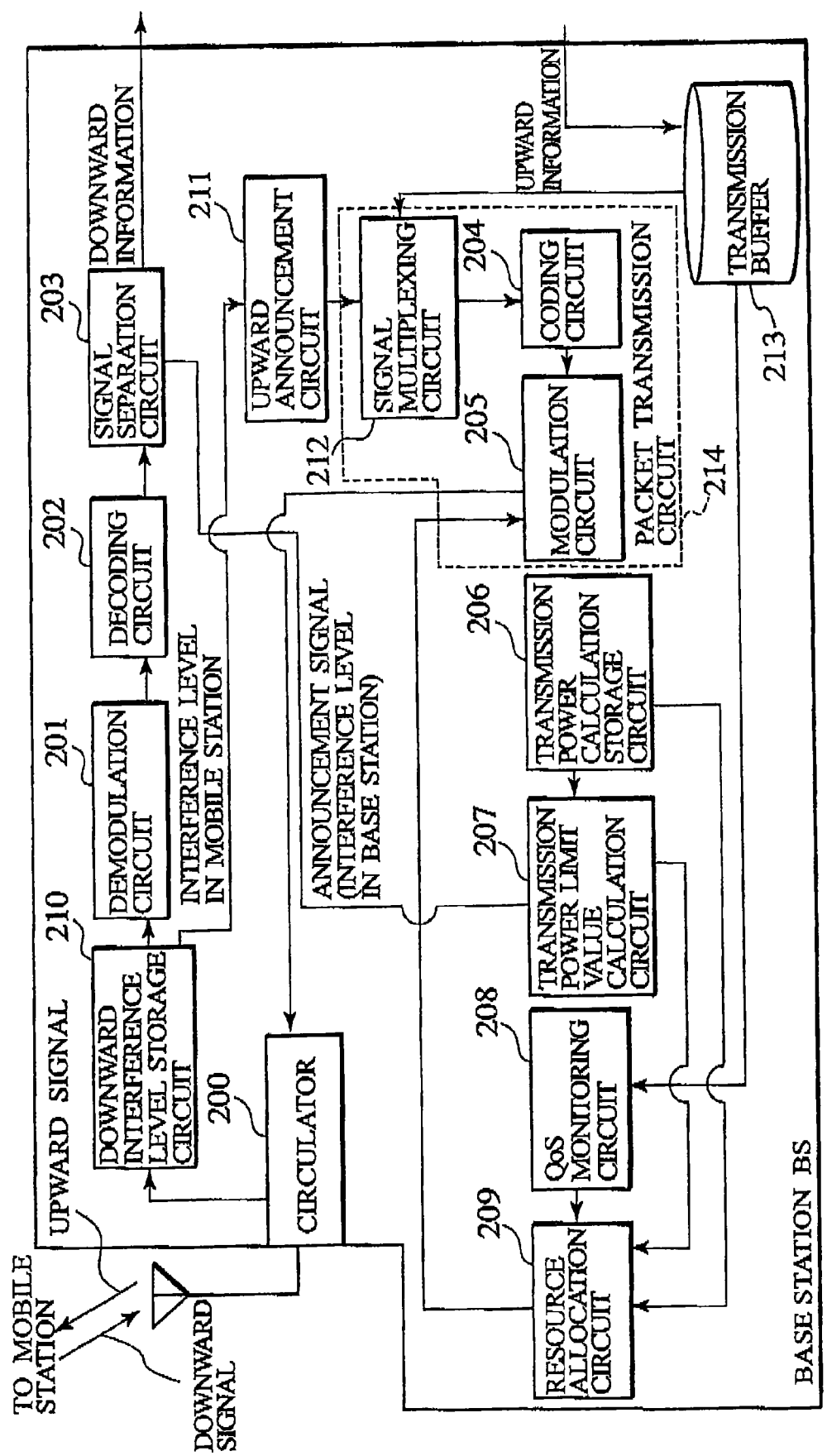
FIG. 12 is a block diagram showing an internal configuration of the mobile station according to the second embodiment of the present invention.

In order to realize the packet communications system described above, in this embodiment, the mobile stations MS1 to MS3 have a configuration as below. Since the mobile stations MS1 and MS3 include basically the same functions, the mobile station MS3 will be described below. FIG. 12 is a block diagram showing the configuration of the mobile station MS3 according to this embodiment.

As shown in FIG. 12, as downlink (downward direction) processing means, the mobile station MS3 includes a downward interference level storage circuit 210, a demodulation circuit 201, a decoding circuit 202 and a signal separation circuit 203.

The downward interference level storage circuit 210 is a storage device configured to detect and store interference levels in the downlink to the mobile station MS3 from the base stations BS1 and BS2. The interference levels stored in this downward interference level storage circuit 210 are outputted to an upward announcement circuit 211.

The downward interference level from the downward interference power level storage circuit 210 is inputted to a signal multiplexing circuit 212 via the upward announcement circuit 211, and multiplexed with upward information. Thereafter, the downward interference level is transmitted to the base station BS1 as an upward signal via a coding circuit 204, a modulation circuit 205 and a circulator 200.

The demodulation circuit 201 is an arithmetic circuit configured to demodulate downward signals obtained via the downlink from the base station BS1. Moreover, the decoding circuit 202 is an arithmetic circuit configured to decode the demodulated downward signals.

The signal separation circuit 203 is a circuit configured to separate signals required for calculating a transmission power limit value (for example, announcement signals from the base station BS1) among the signals decoded by the decoding circuit 202, and outputs the signals to a transmission power limit value calculation circuit 207 to be described later.

Moreover, as uplink (upward direction) processing means, the mobile station MS3 includes a transmission buffer 213, the upward announcement circuit 211, the signal multiplexing circuit 212, the coding circuit 204, the modulation circuit 205, a transmission power calculation storage circuit 206, the transmission power limit value calculation circuit 207, a QoS monitoring circuit 208 and a resource allocation circuit 209.

The transmission buffer 213 is configured to accumulate upward information addressed to the base station BS1 (for example, packets).

The upward announcement circuit 211 is a circuit configured to inform the predetermined base stations BS1 and BS2 of an interference level in the mobile station MS3, which is obtained from the downward interference level storage circuit 210. The upward announcement circuit 211 multiplexes the interference level in the mobile station MS3 into an announcement signal in the signal multiplexing circuit 212.

The signal multiplexing circuit 212 is a circuit configured to multiplex many pieces of upward information accumulated in the transmission buffer 213 and the announcement signal generated by the upward announcement circuit 212 for each of predetermined time slots.

The coding circuit 204 is a circuit configured to code the upward information. Moreover, the modulation circuit 205 is a circuit configured to modulate the upward information coded by the coding circuit 204, by use of radio resources (power resources and the like) which are allocated by the resource allocation circuit 209.

The transmission power calculation storage circuit 206 is a circuit configured to store transmission power of packets in each of step periods (for example, slots) of a predetermined length.

The transmission power limit value calculation circuit 207 is a circuit configured to play a role of limit value calculation means for calculating a transmission power limit value in a next step period in accordance with transmission power of packets in a preceding step period, which is stored in the transmission power calculation storage circuit 206, and information included in the announcement signal separated in the signal separation circuit 203 (for example, an average value of interference levels received by the base station BS1 in a preceding fixed period).

Moreover, when the transmission power of packets in the preceding step period is "0", the transmission power limit value calculation circuit 207 calculates the transmission power limit value in the next step period, by referring to FIG. 15 and using the information included in the announcement signal separated in the signal separation circuit 203 (for example, the average value of the interference levels received by the base station BS1 in the preceding fixed period).

The QoS monitoring circuit 208 is a quality of service monitor configured to monitor quality of service (QoS) in a radio link.

The resource allocation circuit 209 is a circuit configured to allocate radio resources for packet transmission in accordance with respective processing results of the circuits 206 to 208. Specifically, when transmitting one or a plurality of packets in a predetermined radio link, the resource allocation circuit 209 changes transmission power of each of the packets to be allocated for each of the step periods.

Moreover, the resource allocation circuit 209 plays a role of transmission power limiting means for limiting the transmission power of packets in the next step period to be smaller than or equal to the transmission power limit value.

Moreover, when the QoS is smaller than or equal to a predetermined value, in the next step period, the resource allocation circuit 209 may set the transmission power of packets to exceed the transmission power limit within the maximum transmission power.

The circulator 200 is a switching circuit configured to sort signals transmitted/received between the mobile station MS3 and the base station BS1. The circulator 200 outputs an downward signal received from the base station BS1 to the downlink processing circuit, and transmits an upward signal processed by the uplink processing circuit to the base station BS1.

(Packet Communications Method According to this Embodiment)

Figure 16:
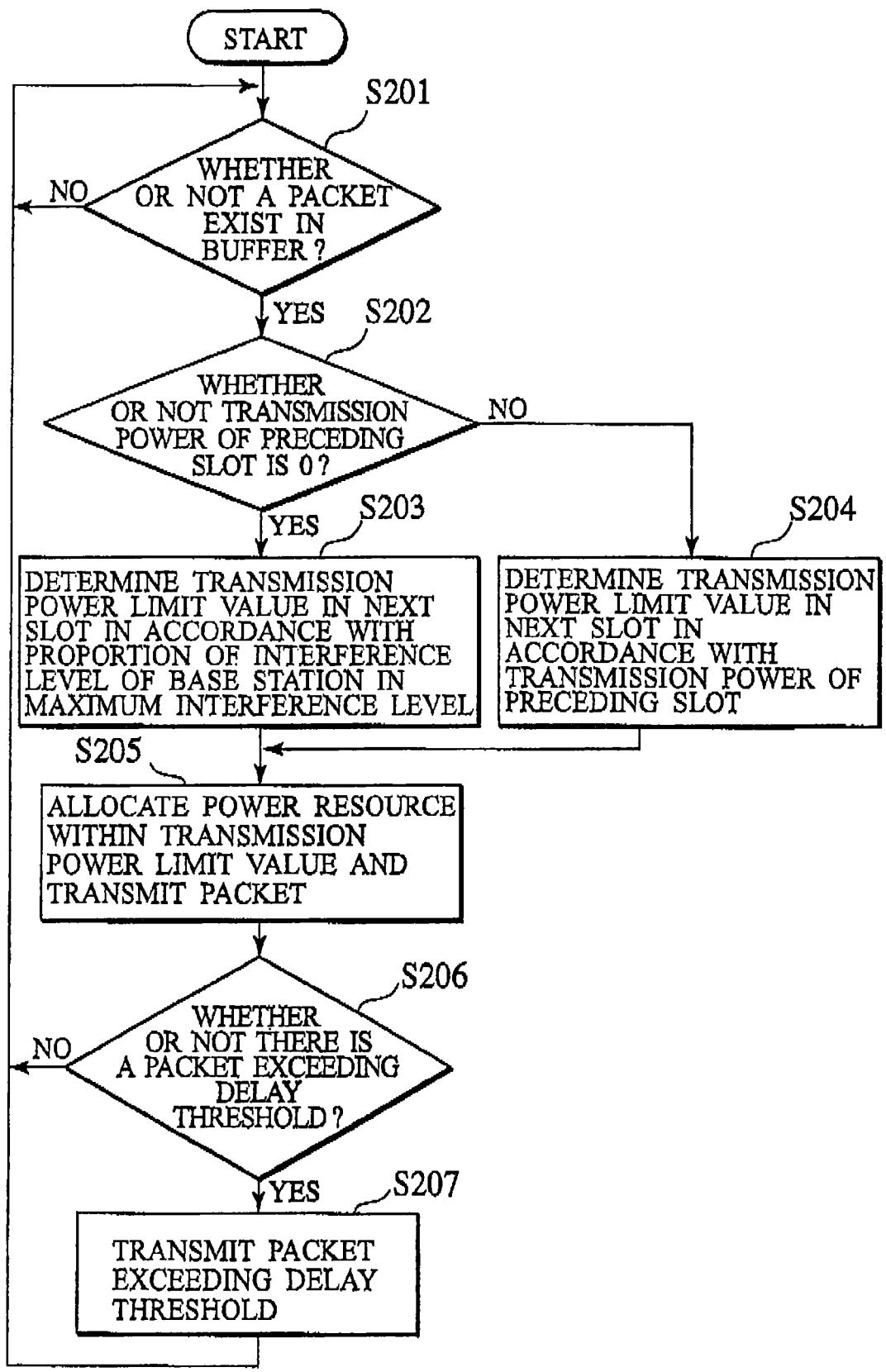
FIG. 16 is a flowchart showing operations of the packet communications system according to the second embodiment of the present invention.

FIG. 16 shows a flowchart of the packet communications method according to this embodiment. The packet communications method according to this embodiment is the same as the packet communications method according to the first embodiment except for an operation of Step S203 and a point that transmission power of packets is controlled by the mobile station MS3. Hereinafter, these differences will be mainly described.

As shown in FIG. 16, in Step S201, the mobile station MS3 determines whether or not there is a packet addressed to the base station MS1 in the transmission buffer 213.

When the mobile station MS3 determines that there is no packet addressed to the base station BS1 in the transmission buffer 213, the mobile station MS3 becomes a stand-by state until a packet addressed to the base station BS1 is accumulated in the transmission buffer 213 by loop processing.

Meanwhile, when the mobile station MS3 determines that there is a packet addressed to the base station BS1 in the transmission buffer 213, the mobile station MS3 determines, in Step S202, whether or not transmission power of packets (total transmission power) in a preceding slot (step period) is "0".

When the transmission power in the preceding slot is determined not to be "0", in Step S204, the transmission power limit value calculation circuit 207 of the mobile station MS3 decides the transmission power limit value in the next slot in accordance with the transmission power in the preceding slot, which is stored in the transmission power calculation storage circuit 206.

Meanwhile, when the transmission power in the preceding slot is "0", in Step S203, the transmission power limit value calculation circuit 113 of the base station BS2 obtains an announcement signal, which is transmitted by the base station BS1, from the signal separation circuit 203. Thereafter, the transmission power limit value calculation circuit 113 refers to FIG. 15 and extracts a "transmission power limit value" corresponding to an "identification signal of an interference level" which is included in the announcement signal.

In Step S205, the resource allocation circuit 209 of the mobile station MS3 allocates radio resources within the transmission power limit value calculated by the transmission power limit value calculation circuit 207, and a packet transmission circuit 214 transmits the packet to the base station BS1 by using the allocated radio resources such as power resources.

In Step S206, the QoS monitoring circuit 208 determines whether or not there is a packet exceeding a delay threshold in the packets staying in the transmission buffer 213.

When there is the packet exceeding the delay threshold in the transmission buffer 213, in Step S207, the resource allocation circuit 209 allocates the radio resources to these packets until the maximum available transmission power of the mobile station MS3 is reached, regardless of the transmission power limit value calculated by the transmission power limit value calculation circuit 207.

Meanwhile, when the packet exceeding the delay threshold are determined not to exist in the transmission buffer 213, the packet communications method according to this embodiment returns to Step S201 and repeats the above-described Steps S201 to S206.

Third Embodiment

Figure 17:
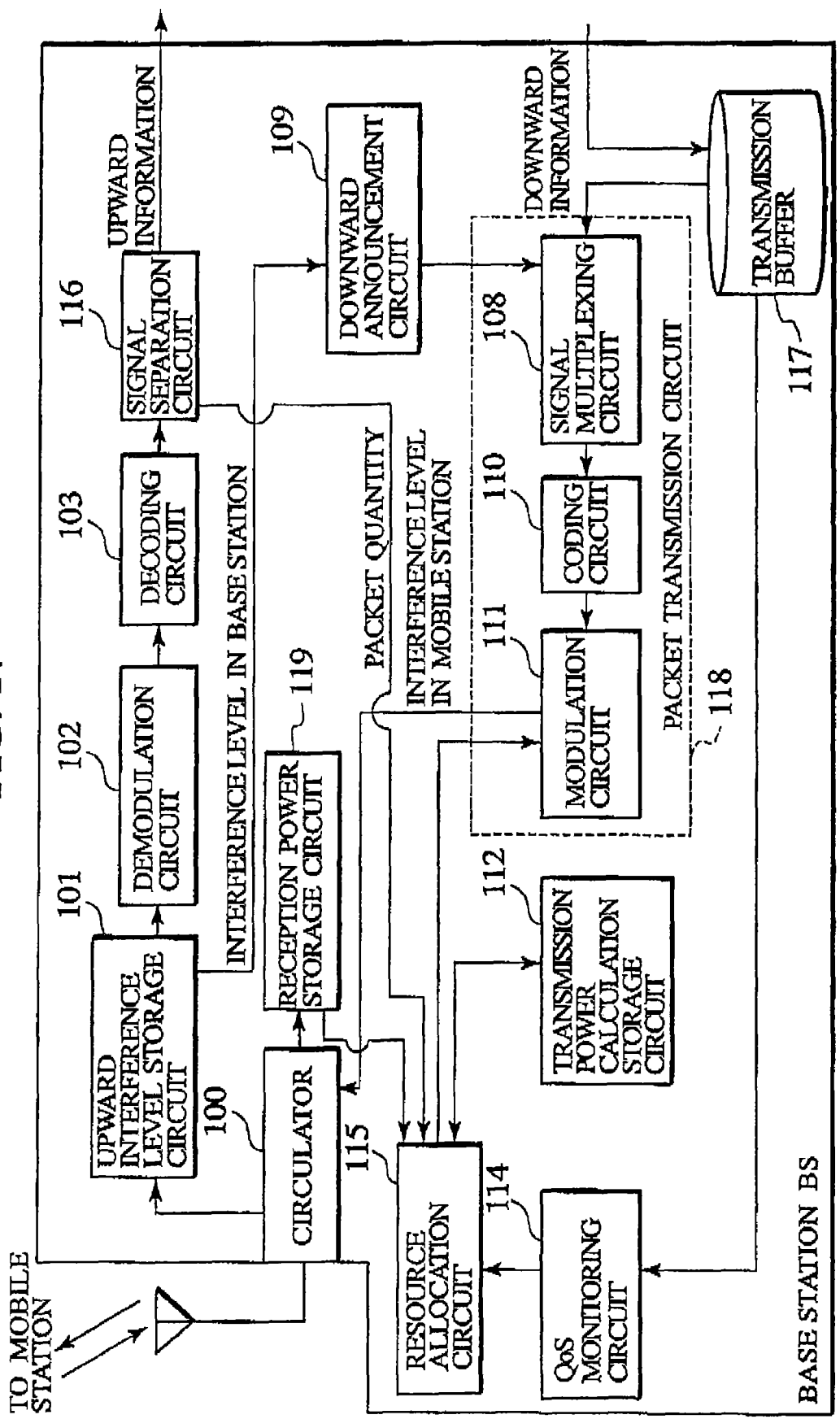
FIG. 17 is a block diagram showing an internal configuration of a base station according to the third embodiment of the present invention.
Figure 18:
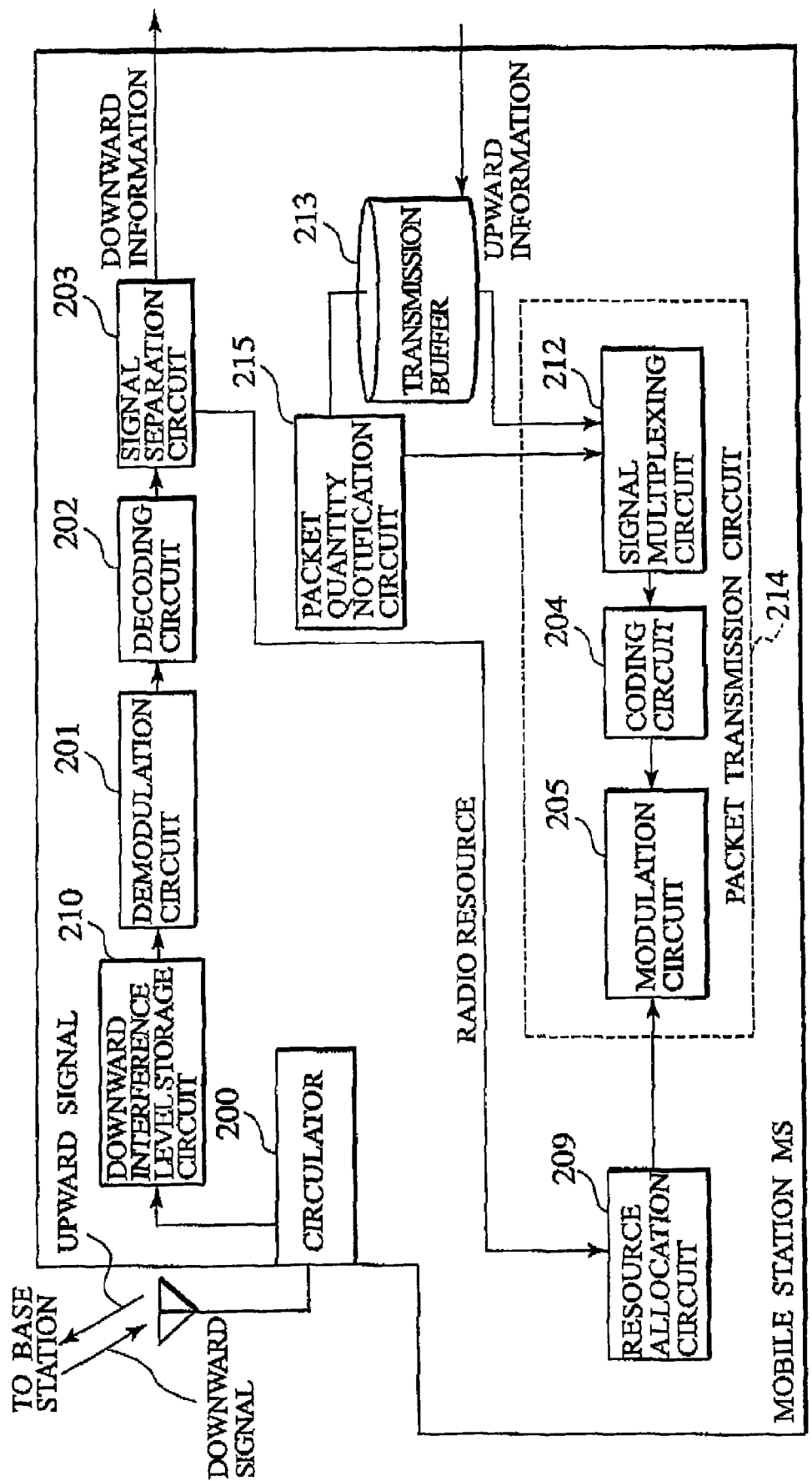
FIG. 18 is a block diagram showing an internal configuration of a mobile station according to the third embodiment of the present invention.

Next, with reference to FIGS. 17 to 19, a packet communications system and a packet communications method according to a third embodiment of the present invention will be described. FIG. 17 is a functional block diagram of a base station BS1 according to this embodiment and FIG. 18 is a functional block diagram of a mobile station MS3 according to this embodiment.

Hereinafter, description will be given of differences between the packet communications system and the packet communications method according to this embodiment and the packet communications systems and the packet communications methods according to the first and second embodiments described above.

As shown in FIG. 17, the base station BS according to this embodiment includes a reception power storage circuit 119 in addition to the functions of the base station BS according to the first embodiment shown in FIG. 7.

The reception power storage circuit 119 is a circuit configured to store a sum of reception power of packets transmitted from all mobile stations MS in the base station in a preceding step period. Moreover, in response to a request from the resource allocation circuit 115, the reception power storage circuit 119 provides the stored sum of the reception power of packets.

Moreover, the signal separation circuit 116 extracts the quantity of packets accumulated in the transmission buffer 213 of the mobile station MS from among upward information decoded by the decoding circuit 103, and transmits the quantity of packets to the resource allocation circuit 115.

Moreover, based on a sum of reception power in a preceding step period, which is received from the reception power storage circuit 119, and the quantity of packets accumulated in the transmission buffer 213 of the mobile station MS, which is received from the signal separation circuit 116, the resource allocation circuit 115 allocates radio resources (code resources, slot resources and the like) of the mobile station MS in a next step.

For example, based on the above-described sum of reception power in the preceding step period, the resource allocation circuit 115 calculates total available reception power in the next step period.

Here, in the base station BS, transmission power control is performed at constant reception power. Thus, reception power per code is the same. Therefore, based on the above-described total available reception power in the next step period, the resource allocation circuit 115 can calculate the number of codes which can be allocated in the next step period.

Then, based on the above-described quantity of packets, the resource allocation circuit 115 calculates the number of codes to be allocated to the respective mobile stations MS from the number of codes which can be allocated.

The resource allocation circuit 115 transmits the number of codes allocated to the respective mobile stations MS to the modulation circuit 111.

As shown in FIG. 18, the mobile station MS according to this embodiment includes a packet quantity notification circuit 215 in addition to the functions of the mobile station MS according to the second embodiment shown in FIG. 12.

The packet quantity notification circuit 215 is a circuit configured to notify the base station BS of the quantity of packets accumulated in the transmission buffer 213 (such as an amount of data or the number of packets), by multiplexing the quantity of packets with control information or upward packets in the signal multiplexing circuit 212.

Moreover, the packet quantity notification circuit 215 may periodically notify the base station BS of the quantity of packets accumulated in the transmission buffer 213 without multiplexing the quantity of packets with the control information or the upward packets.

The signal separation circuit 203 extracts radio resources (code resources, slot resources and the like) in the next step period from among downward information decoded by the decoding circuit 202, and transmits the radio resources to the resource allocation circuit 209.

In the next step period, the resource allocation circuit 209 allocates radio resources for packet transmission in accordance with the radio resources transmitted from the signal separation circuit 203.

Figure 19:
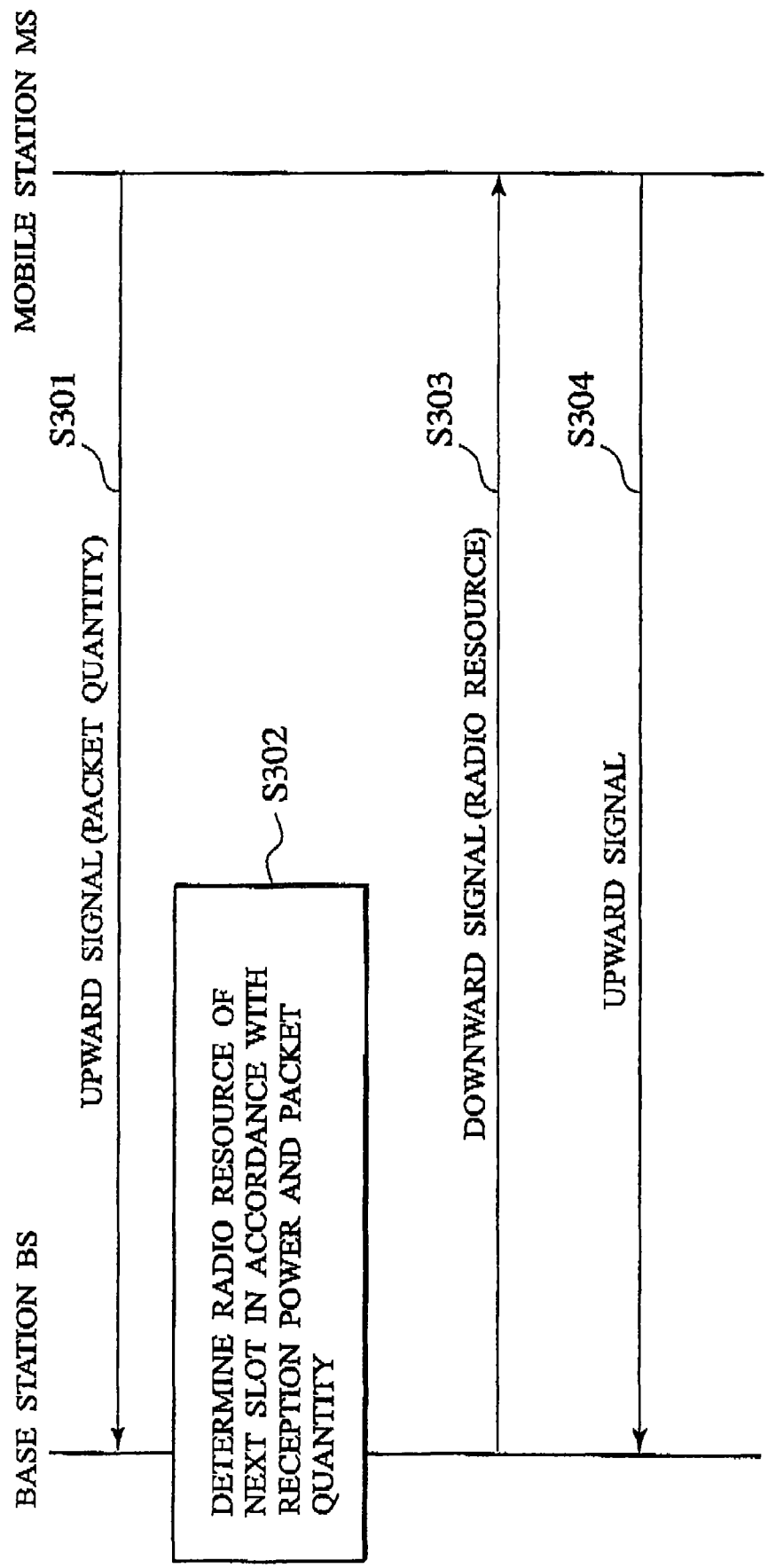
FIG. 19 is a sequence diagram showing operations of a packet communications system according to the third embodiment of the present invention.

With reference to FIG. 19, the packet communications method according to this embodiment will be described.

In Step S301, the mobile station MS transmits an upward signal multiplexed with the quantity of packets accumulated in the transmission buffer 213 to the base station BS.

In Step S302, in accordance with reception power of packets in a preceding step period, which is stored in the reception power storage circuit 119, and the quantity of packets accumulated in the transmission buffer 213 of the mobile station MS, which is transmitted from the signal separation circuit 116, the base station BS calculates radio resources (code resources, slot resources and the like) of the mobile station MS in a next step period.

In Step S303, the base station BS transmits the calculated radio resources of the mobile station MS in the next step period to the mobile station MS, by multiplexing the radio resources with a downward signal.

In Step S304, the resource allocation circuit 209 of the mobile station MS allocates radio resources for packet transmission (in other words, determines transmission power of packets) in the next step period, in accordance with the radio resources of the mobile station, which are received from the base station BS. Thereafter, the packet transmission circuit 214 of the mobile station MS transmits an uplink signal to the base station BS by use of the allocated radio resources.

According to the packet communications system of this embodiment, without having a particularly special configuration, the transmission power of packets in the mobile station MS is limited in stages at the mobile station MS side. Thus, packet reception failure in another mobile station can be prevented. In addition, reduction in capacity and deterioration of QoS satisfaction can be prevented.

Moreover, according to the packet communications system of this embodiment, influences of interference on burst signals can be reduced and a communication quality can be further improved.

Moreover, according to the packet communications system of this embodiment, the base station BS can appropriately instruct the mobile station MS to change the transmission power in the next step period, by use of the quantity of packets notified from the mobile station MS.

Moreover, according to the packet communications system of this embodiment, the mobile station MS can perform notification of the quantity of packets together with transmission of packets. Thus, it is not required to separately notify the quantity of accumulated packets.

Moreover, according to the packet communications system of this embodiment, the base station BS can periodically allocate the radio resources to be used, by use of the periodically notified quantity of packets. Thus, the mobile station can receive allocation of radio resources, which is periodically reviewed, and can be prevented from receiving allocation of unnecessary radio resources.

Moreover, according to the packet communications system of this embodiment, unlike scheduling, it is not required to always exchange information, such as priority and elapsed time, about all transmitted packets between the mobile stations or between the base station and the mobile station, so as to understand the information.

Modified Example 1

Note that the packet communications systems and the packet communications methods according to the first to third embodiments described above can be realized by executing a packet communications program described in a predetermined computer language on a computer provided in a base station or a radio control device or on an IC chip included in a mobile station such as a portable telephone set.

Specifically, the packet communications program according to this embodiment is configured to execute each processing described in the first to third embodiments described above by use of hardware resources included in a general purpose computer.

Figure 13:
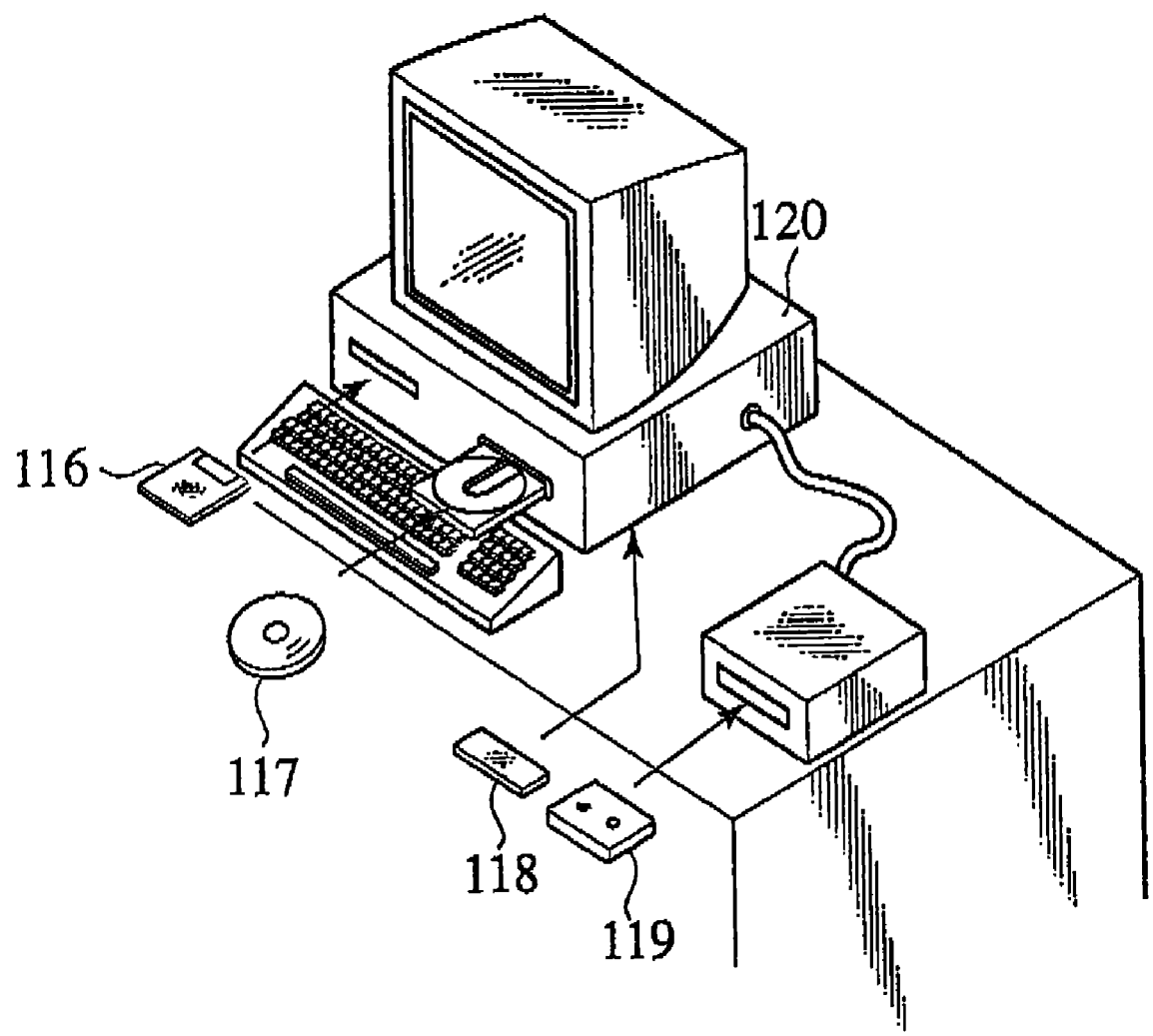
FIG. 13 is a cubic diagram showing a computer-readable recording medium recording a packet communications program according to a third embodiment of the present invention.

Such a packet communications program is recorded in a recording medium (a floppy disk 116, a CD-ROM 117, a RAM 118 and a cassette tape 119) which can be read by a computer 120 as shown in FIG. 13. Accordingly, the device described in the first to third embodiments described above can be realized via this recording medium, through the computer 120 or by directly installing the program in memories of the mobile stations MS1 to MS3 and the like. Consequently, through these recording media, software can be easily saved in, delivered to or transferred to the computer 120.

Moreover, such a packet communications program can be delivered to a mobile station used by a user through service modes such as downloading via a radio network. Thus, smooth spread of the above-described packet communications system and packet communications method can be realized.

Modified Example 2

Moreover, the present invention is not limited to the first to third embodiments described above but may have the following various changes added thereto.

For example, in the above-described embodiments, the packet communications system and packet communications method of the present invention have been described based on the relationship between the base station and the mobile station. The present invention can be also applied to a case where a mobile station functions as a relay station for another mobile station or a base station, such as an ad hoc technology and a multi-hop technology, for example.

In this case, when the mobile station as the relay station becomes a transmitting side, the above-described transmission control is performed. For example, when relaying is performed between another mobile station and the base station, transmission power control in an uplink for the base station is performed and, at the same time, transmission power control in a downlink for another mobile station is performed. Moreover, when relaying is performed between base stations, the transmission power control in the uplink for the base stations is performed.

Moreover, in the first to third embodiments described above, the transmission power control is performed for the base station or the mobile station. However, for example, the transmission power control can be also performed in a radio control device which controls respective base stations.

In this case, interference levels and QoS of respective base stations are sequentially notified to the radio control device and transmission power and an interference level of a mobile station which establishes communications with the respective base stations are monitored by the radio control device through the respective base stations. Accordingly, a transmission power limit value is calculated by the radio control device, and notified to the respective base stations and the mobile station.

Specifically, a control device for realizing the packet communications system according to the present invention controls transmission power of packets in a next step period, in accordance with transmission power of packets in a preceding step period and an interference level in a receiving station. Thus, it is needless to say that the control device is mounted in a base station and a mobile station. Moreover, the control device may be mounted on the radio control device which indirectly controls the base station.

INDUSTRIAL APPLICABILITY

As described above, according to the present invention, a transmission power limit value in a next step period is determined by use of actual transmission power of packets in a preceding step period. Thus, an increase of an interference level in a mobile station belonging to another cell can be suppressed within a TPC margin. In addition, reduction in capacity and deterioration of QoS satisfaction due to reception failure can be prevented.

In particular, according to the present invention, prediction of the next step period is performed based on the preceding step period. Thus, influences of interference on burst signals can be reduced and a communication quality can be further improved.

The invention claimed is:

1. A control device which controls packet communications performed through a radio link established between a base station and a mobile station, the control device comprising:
   a resource allocator configured to calculate a radio resource for the mobile station in a next step period and notify the mobile station of the radio resource calculated, wherein the radio resource is calculated based on a total reception power of packets transmitted from all mobile stations under the base station in a preceding step period and a quantity of packets accumulated in the mobile station to be transmitted from the mobile station.

2. A base station which performs packet communications through a radio link established between the base station and a mobile station, the base station comprising:
   a resource allocator configured to calculate a radio resource for the mobile station in a next step period and notify the mobile station of the radio resource calculated, wherein the radio resource is calculated based on a total reception power of packets transmitted from all mobile stations under the base station in preceding step period and a quantity of packets accumulated in the mobile station to be transmitted from the mobile station.

3. A computer readable medium embodied with a computer program, which when executed by a control device, causes the control device to perform a method of controlling packet communications through a radio link established between a base station and a mobile station, the method comprising:

calculating a radio resource for the mobile station in a next step period and notifying the mobile station of the radio resource calculated, wherein the radio resource is calculated based on a total reception power of packets transmitted from all mobile stations under the base station in a preceding step period and a quantity of packets accumulated in the mobile station to be transmitted from the mobile station.

* * * * *